United States Patent
Jeong et al.

(10) Patent No.: US 10,146,712 B2
(45) Date of Patent: Dec. 4, 2018

(54) METHOD OF COMMUNICATING WITH PERIPHERAL DEVICE IN ELECTRONIC DEVICE ON WHICH PLURALITY OF OPERATING SYSTEMS ARE DRIVEN, AND THE ELECTRONIC DEVICE

(71) Applicant: SAMSUNG ELECTRONICS CO., LTD., Suwon-si, Gyeonggi-do (KR)

(72) Inventors: Bok-deuk Jeong, Yongin-si (KR); Anatoly Stepanov, Novotroizk (RU); Sung-min Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 237 days.

(21) Appl. No.: 15/046,921

(22) Filed: Feb. 18, 2016

(65) Prior Publication Data
US 2016/0253276 A1    Sep. 1, 2016

(30) Foreign Application Priority Data

Feb. 27, 2015  (KR) .......................... 10-2015-0028587

(51) Int. Cl.
*G06F 13/20* (2006.01)
*G06F 13/38* (2006.01)

(52) U.S. Cl.
CPC .............. *G06F 13/20* (2013.01); *G06F 13/38* (2013.01)

(58) Field of Classification Search
USPC ................. 710/33, 15–16, 8–10, 62–64, 315
See application file for complete search history.

(56) References Cited

U.S. PATENT DOCUMENTS

| | | | |
|---|---|---|---|
| 8,010,096 B2 * | 8/2011 | Kahler | H04W 8/22 455/418 |
| 8,332,846 B2 | 12/2012 | Astrand | |
| 8,798,541 B1 | 8/2014 | Scott | |
| 8,799,900 B1 | 8/2014 | Kodorkin et al. | |
| 2009/0083450 A1 * | 3/2009 | Peterson | G06F 9/45558 710/10 |
| 2012/0331116 A1 | 12/2012 | Zhang et al. | |
| 2013/0227175 A1 | 8/2013 | Ting | |
| 2014/0075574 A1 * | 3/2014 | Zheng | G06F 21/31 726/28 |
| 2014/0244877 A1 * | 8/2014 | Williamson | G06F 13/24 710/262 |
| 2015/0067196 A1 * | 3/2015 | Little | G06F 9/441 710/14 |
| 2016/0019079 A1 * | 1/2016 | Chawla | G06F 9/45558 710/308 |
| 2016/0124754 A1 * | 5/2016 | Maharana | G06F 9/45558 710/313 |

* cited by examiner

*Primary Examiner* — Raymond Phan
(74) *Attorney, Agent, or Firm* — Nixon & Vanderhye, P.C.

(57) ABSTRACT

A method of communicating with a peripheral device in a host operating system (OS) and a guest OS installed on an electronic device includes: receiving, by the host OS, first data from the guest OS; determining, by the host OS, whether to switch from a first communication link to a second communication link to transmit and receive data between the electronic device and the peripheral device; packetizing, by the host OS, the first data based on the determination; and transmitting the packetized data to the peripheral device.

20 Claims, 27 Drawing Sheets

| IDENTIFICATION INFORMATION OF PERIPHERAL DEVICE (MACaddress) | WHETHER HOST OS SHARES PERIPHERAL DEVICE WITH GUEST OS |
|---|---|
| FIRST PERIPHERAL DEVICE (0x1111 2222 3333) | TRUE (0X1) |
| DEVICE A (0x1111 2222 4444) | FALSE (0X0) |
| DEVICE B (0x1111 2222 5555) | TRUE (0X1) |
| ... | ... |

PERIPHERAL DEVICE

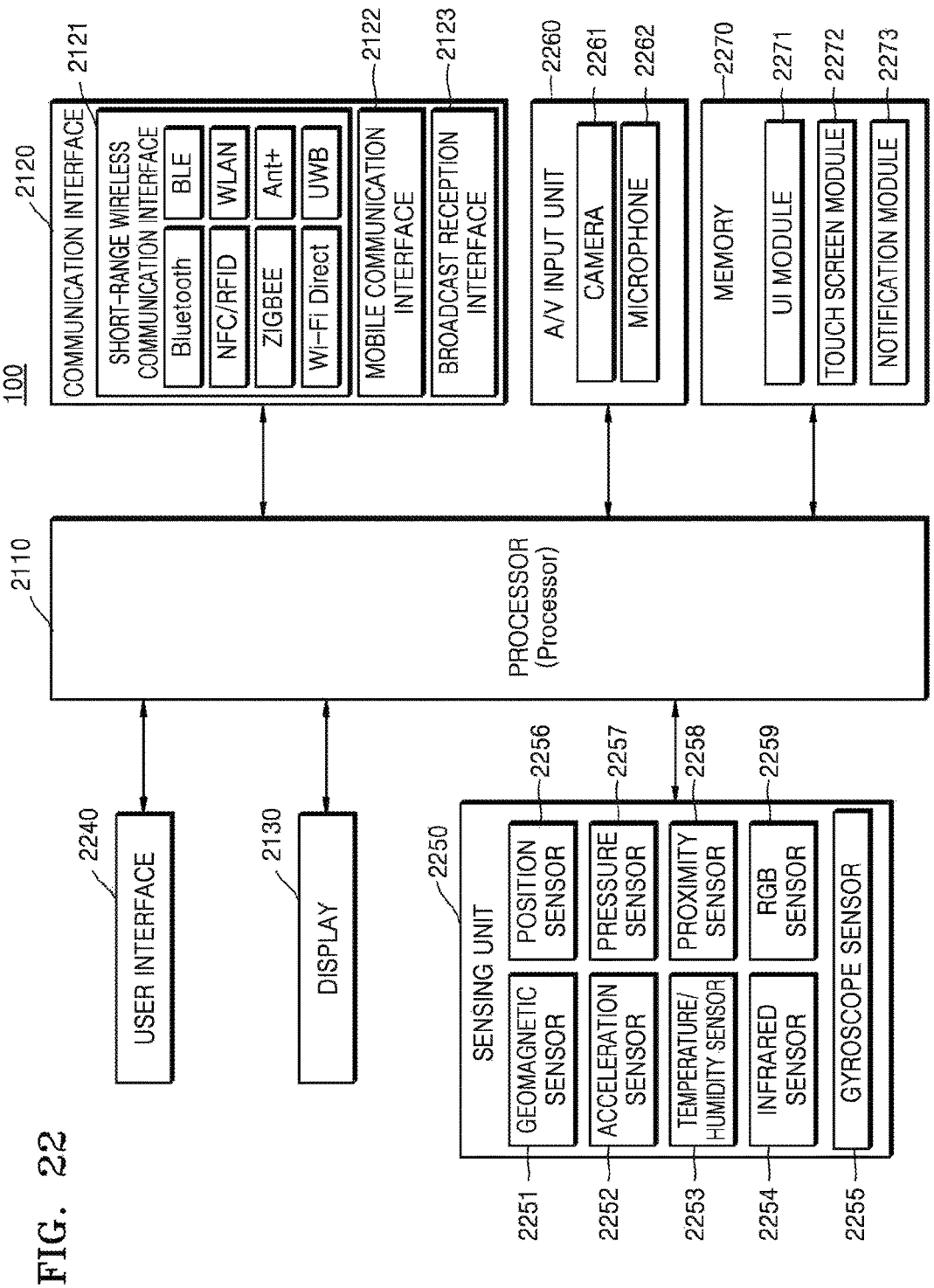

METHOD OF COMMUNICATING WITH PERIPHERAL DEVICE IN ELECTRONIC DEVICE ON WHICH PLURALITY OF OPERATING SYSTEMS ARE DRIVEN, AND THE ELECTRONIC DEVICE

CROSS-REFERENCE TO RELATED APPLICATION

This application is based on and claims priority under 35 U.S.C. § 119 to Korean Patent Application No. 10-2015-0028587, filed on Feb. 27, 2015, in the Korean Intellectual Property Office, the disclosure of which is incorporated by reference herein in its entirety.

BACKGROUND

1. Field

The disclosure relates to a method of communicating with a peripheral device in an electronic device on which a plurality of operating systems (OSs) are driven, and the electronic device.

2. Description of Related Art

Bluetooth complying with IEEE 802.15.1 standard is an industry standard for a personal area network (PAN). Bluetooth is a communication protocol that uses 2.4 GHz industrial-scientific-medical (ISM) band and is designed to enable a low-power-consumption system to be configured at a low cost.

Examples of applications using Bluetooth communication technology include wireless control and communication between a smart device and a hand-free headset, wireless control and communication between a smart device and a Bluetooth car stereo system, wireless control and communication between a tablet and a speaker, wireless control and communication between a wireless Bluetooth headset and an intercom, and wireless communication between personal computer (PC) input and output devices, such as a mouse, a keyboard, and a printer.

Bluetooth is intended for a smart device and its applications.

As the use of smart devices has increased, Bluetooth devices also have been developed to improve user convenience of the smart devices. Also, as the use of the smart devices has become common, functions having been executed by various devices need to be executed by one smart device. In response to such needs, the smart devices have been developed to perform functions having been provided by various devices together by driving a plurality of OSs. Therefore, there is a need to provide a method of and apparatus for allowing a smart device, on which a plurality of OSs are driven, to efficiently communicate with peripheral devices.

SUMMARY

Methods of and apparatuses for transmitting data through a communication link set between a host OS and a peripheral device in the host OS and a guest OS when the host OS or the guest OS driven in an electronic device transmits data to the peripheral device are provided.

Methods of and apparatuses for reducing overhead necessary to switch from a communication link set between a host OS and a peripheral device to a communication link set between a guest OS and the peripheral device when the host OS or the guest OS driven in an electronic device transmits data to the peripheral device are provided.

Additional aspects will be set forth in part in the description which follows and, in part, will be apparent from the description.

According to an aspect of an example embodiment, a method of communication between an electronic device and a peripheral device in a host OS and a guest OS installed on the electronic device includes: receiving, by the host OS, first data from the guest OS; determining, by the host OS, whether to switch from a first communication link to a second communication link to transmit and receive data between the electronic device and the peripheral device; packetizing, by the host OS, the first data based on the determination; and transmitting the packetized data to the peripheral device.

The first communication link may be a communication link set between the host OS and the peripheral device, and a second communication link may be a communication link set between the guest OS and the peripheral device, and the second communication link may share a link key with first communication link, the link key being stored in the host OS and the peripheral device at time of setting the first communication link.

The determining of whether to switch from the first communication link to the second communication link may include determining to switch from the first communication link to the second communication link when the first data includes a host controller interface (HCI) packet, and determining to maintain the first communication link when the first data does not include an HCI packet.

The determining of whether to switch from the first communication link to the second communication link may include: determining to switch from the first communication link to the second communication link when the host OS exclusively uses the peripheral device, and determining to maintain the first communication link when the host OS shares the peripheral device with the guest OS.

The first data may include an HCI packet generated by the guest OS based on the second communication link.

The packetizing of the first data by the host OS when it is determined to switch to the second communication link may include generating a Bluetooth packet corresponding to the HCI packet included in the first data.

The packetizing of the first data by the host OS when it is determined to maintain the first communication link may include: performing, by the host OS, authentication with the peripheral device based on the link key stored in the host OS and the peripheral device at the time of setting the first communication link; generating, by the host OS, an HCI packet for the first data based on the first communication link; and generating a Bluetooth packet corresponding to the HCI packet based on physical characteristics of the first communication link.

The first data may include audio data or human interface device (HID) data.

When it is determined to maintain the first communication link, the method may further include: acquiring, by the host OS, second data processed in the host OS; combining, by the host OS, the first data with the second data; and transmitting the combined data to the peripheral device based on the first communication link.

The first communication link and the second communication link may be used to transmit an asynchronous connectionless (ACL) packet or a synchronous connection oriented (SCO) packet.

According to another aspect of another example embodiment, a method of communication between an electronic device and a peripheral device in a host OS and a guest OS installed on the electronic device includes: switching from an operation screen of the host OS displayed on a screen of the electronic device to an operation screen of the guest OS; determining whether to switch from a first communication link to a second communication link to transmit and receive data between the electronic device and the peripheral device; packetizing, by the host OS, third data received from the guest OS based on the determination; and transmitting the packetized data to the peripheral device.

According to an aspect of another example embodiment, a method of communication between an electronic device and a peripheral device in a host OS and a guest OS installed on the electronic device includes: receiving, by the host OS, a request to search for peripheral devices from the guest OS; searching, by the host OS, for at least one peripheral device; extracting, by the host OS, a peripheral device capable of setting a communication link with the guest OS from among at least one found peripheral device; and transmitting, by the host OS, information on the extracted peripheral device to the guest OS.

The extracting of the peripheral device capable of setting the communication link with the guest OS may include: extracting a peripheral device which has not set a communication link with the host OS from among the at least one found peripheral device; and extracting a peripheral device which has set a communication link with the host OS and is set to be exclusively used by the host OS, from among the at least one found peripheral device.

According to an aspect of another example embodiment, an electronic device includes: a processor (e.g., processing circuitry) configured to control a guest OS and a host OS which receives first data from the guest OS, to determine whether to switch from a first communication link to a second communication link, and to packetize the first data based on the determination, the first communication link being set to transmit and receive data between the electronic device and the peripheral device; and a communication interface configured to transmit data packetized by the host OS to the peripheral device.

The processor may be configured to switch from the first communication link to the second communication link when the first data includes an host controller interface (HCI) packet, and to maintain the first communication link when the first data does not include an HCI packet.

The processor may be configured to control the host OS to generate a Bluetooth packet corresponding to the HCI packet included in the first data when it is determined to switch to the second communication link.

When it is determined to maintain the first communication link, the processor may be configured to control the host OS to perform authentication with the peripheral device based on the link key stored in the host OS and the peripheral device at the time of setting the first communication link, to generate an HCI packet for the first data based on the first communication link, and to generate a Bluetooth packet corresponding to the HCI packet based on physical characteristics of the first communication link.

When it is determined to maintain the first communication link, the processor may be configured to control the host OS to acquire second data processed in the host OS and to combine the first data with the second data. The communication interface may be configured to transmit data resulting from combination by the host OS to the peripheral device based on the first communication link.

the communication interface may be configured to transmit an asynchronous connectionless (ACL) packet or a synchronous connection oriented (SCO) packet.

According to an aspect of another example embodiment, an electronic device includes: a display configured to perform switching from an operation screen of the host OS displayed on a screen of the electronic device to an operation screen of the guest OS; a control unit configured to control a guest OS, and a host OS to determine whether to switch from a first communication link to a second communication link, and to packetize third data received from the guest OS based on the determination, the first communication link being set to transmit and receive data between the electronic device and the peripheral device; and a communication interface configured to transmit data packetized by the host OS to the peripheral device.

BRIEF DESCRIPTION OF THE DRAWINGS

These and/or other aspects will become more apparent and more readily appreciated from the following detailed description, taken in conjunction with the accompanying drawings, in which like reference numerals refer to like elements, and wherein:

FIG. 4 is an diagram illustrating a table in which settings to determine whether a host OS will share a peripheral device with the guest OS is stored;

FIGS. 21 and 22 are block diagrams illustrating example configurations of an electronic device.

DETAILED DESCRIPTION

Figure 1:
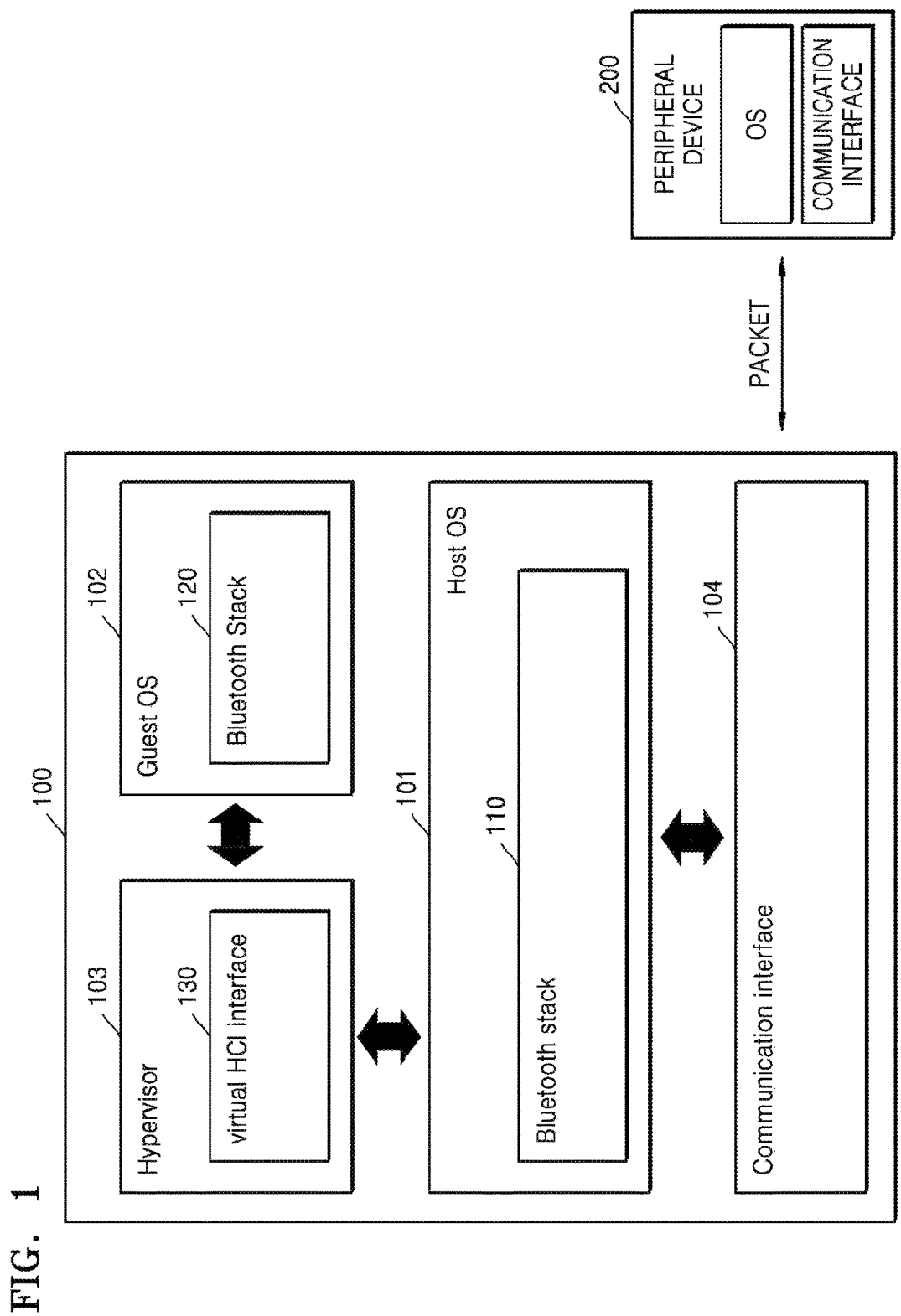
FIG. 1 is a diagram illustrating an example electronic device and a peripheral device.

Reference will now be made in greater detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are simply described below, by referring to the figures, to explain aspects. As used herein, the term "and/or" includes any and all combinations of one or more of the associated listed items. Expressions such as "at least one of," when preceding a list of elements, may modify the entire list of elements and do not necessarily modify the individual elements of the list.

The terms used in this disclosure are general terms currently widely used in the art in consideration of functions in regard to the disclosure, but the terms may vary according to the intention of those of ordinary skill in the art, precedents, or new technology in the art. In addition, specified terms may be selected arbitrarily, and in this case, the detailed meaning thereof will be described in the detailed description. Thus, the terms used in the specification should be understood not as simple names but based on the meaning of the terms and the overall description of the disclosure.

It will also be understood that the terms "comprises", "includes", and "has", when used herein, may refer the presence of stated elements, but do not preclude the presence or addition of other elements, unless otherwise defined. Also, the terms "unit" and "module" used herein represent a unit for processing at least one function or operation, which may be implemented by hardware, software, or a combination of hardware and software. The term "processor" may refer generally to processing circuitry with may include, for example, a single processor, multiple processors, each or which may include one or more processor cores, and may also include other hardware (e.g., circuitry), software, firmware or any combination thereof which are configured to perform the functions of the processor.

The example embodiments will be described with reference to the accompanying drawings in such a manner that the example embodiments may be easily understood by those of ordinary skill in the art. However, the disclosure may be implemented in various forms and is not limited to the example embodiments. In addition, descriptions of well-known functions and constructions may be omitted for clarity and conciseness, and similar reference numerals are assigned to similar elements throughout the specification.

FIG. 1 is a diagram illustrating an example electronic device 100 and a peripheral device 200.

Referring to FIG. 1, the electronic device 100 may include a host OS 101, a guest OS 102, and a hypervisor 103.

According to an example embodiment, the host OS 101 may, for example, be configured to execute various application programs by controlling resources and elements of the electronic device 100. For example, the host OS 101 may process data, packetize processed data, and transmit packetized data to the peripheral device 200 through a communication interface (e.g., including communication circuitry) 104. To packetize data may, for example, refer to generating a packet in order for the host OS 101 to transmit and receive data to and from an external device or another element of the electronic device 100. For example, packetizing may include addition of identification information to data, encryption, error correction, or the like.

According to an example embodiment, the guest OS 102 may, for example, be a virtual OS. The virtual OS may allow one device to execute a plurality of OSs in parallel. For example, the guest OS 102 may be configured to execute various application programs in the guest OS 102. However, the guest OS 102 may not directly control resources and elements of the electronic device 100.

For example, the guest OS 102 may be configured to process data and packetize the processed data. However, the guest OS 102 may not directly control the communication interface 104 in order to transmit the packetized data to the peripheral device 200, and may transmit the packetized data to the host OS 101.

According to an example embodiment, the hypervisor 103 may be configured to control access of the host OS 101 or the guest OS 102 to the resources and elements of the electronic device 100. The hypervisor 103 may include, for example, a virtual interface for transmission and reception of data between the guest OS 102 and the host OS 101. The virtual interface may provide a virtualization mechanism for input/output (I/O) between the guest OS 102 and the host OS 101. For example, a virtual HCI interface 130 may receive a host controller interface (HCI) packet from the guest OS 102 or transmit a HCI packet received from the host OS 101 to the guest OS 102.

The hypervisor 103 may, for example, be executed on the host OS 101 or may be executed independently from the host OS 101. In the former case, the hypervisor 103 may, for example, be an application program executed on the host OS 101. In the later case, the hypervisor 103 may, for example, be firmware on a certain element (for example, processor) of the electronic device 100. In the following example embodiments, it is assumed that the hypervisor 103 is executed on the host OS 101 for convenience of description, but is not limited thereto.

In the above description, the host OS 101 and the guest OS 102 may be homogeneous OSs or heterogeneous OSs. Although one host OS and one guest OS are described as being executed in the electronic device 100 with reference to FIG. 1, example embodiments are not limited thereto. One host OS and a plurality of guest OSs may be executed in the electronic device 100.

The host OS 101 and the guest OS 102 executed in the electronic device 100 may communicate with the peripheral device 200. According to an example embodiment, the host OS 101 or the guest OS 102 may transmit and receive data processed by the host OS 101 or the guest OS 102 to and from the peripheral device 200 through a communication link set between the electronic device 100 and the peripheral device 200.

Figure 2:
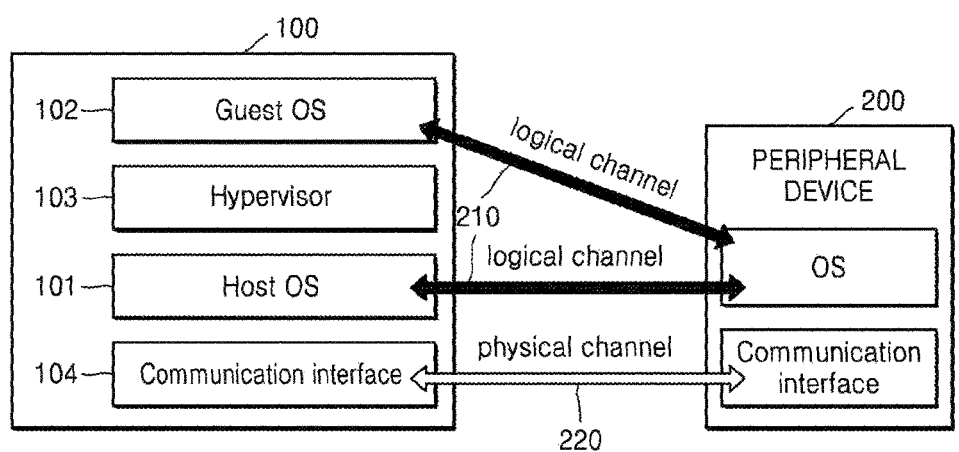
FIG. 2 is a diagram illustrating an example communication link for transmission and reception of data between an electronic device and a peripheral device.

FIG. 2 is a diagram illustrating an example communication link for transmission and reception of data between the electronic device 100 and the peripheral device 200.

Referring to FIG. 2, the communication link may include, for example, a logical channel 210 and a physical channel 220. The logical channel 210 may be a logical unit for controlling packets transmitted and received among a plurality of devices. The physical channel 220 may be a physical transmission path for transmitting and receiving packets among the plurality of devices and may be configured in a wired manner or in a wireless manner.

The logical channel 210 may, for example, perform first packetizing including authentication, addition of identification information of a counterpart device, error control, or the like. In this example, an object that controls the logical channel 210 may be the host OS 101 or the guest OS 102. In the example of setting the logical channel 210 (e.g., initial setting, for example, in the case of performing the pairing procedure with a Bluetooth peripheral device), for example, authentication may be performed based on a link key stored in the object that controls the logical channel 210 (e.g., the host OS 101 or the guest OS 102) and the peripheral device 200. The data on which the first packetization has been performed may include an HCI packet.

Second packetization may be performed, for example, in the physical channel 220, the second packetization may include, for example, addition of information according to characteristics of a physical transmission path between devices, packet segmentation, packet transmission and reception, or the like. In this example, an object which controls the physical channel 220 may be the host OS 101. Data on which the second packetization has been performed may include, for example, a Bluetooth packet, a USB packet, a universal asynchronous receiver/transmitter (UART) packet, and the like.

A communication link including the logical channel 210 and the physical channel 220 controlled by the host OS 101 may, for example, be referred to as a first communication link, and a communication link including the logical channel 210 controlled by the guest OS 102 and the physical channel 220 controlled by the host OS 101 may be referred to as a second communication link.

When the first communication link is set between the host OS 101 and the peripheral device 200, it may be necessary to switch from the first communication link to the second communication link in order for the guest OS 102 to communicate with the peripheral device 200, resulting in occurrence of an overhead. For example, when an object that controls the logical channel 210 of a communication link is changed, the electronic device 100 may perform setting of a communication link with the peripheral device 200 (for example, pairing procedure) in order to discard a link key which has been used previously and store a new link key.

In order for the guest OS 102 to transmit data to the peripheral device 200 through the first communication link, it may be necessary for the host OS 101 to decompose data on which the first packetization has been performed and again perform the first packetization on the data according to the first communication link, leading to occurrence of an overhead.

According to an example embodiment, the electronic device may allow the host OS 101 to perform first packetization and second packetization on data generated when a first communication link is set between the host OS 101 and the peripheral device 200. Therefore, the host OS 101 may reduce overhead associated, for example, with decomposing data transmitted from the guest OS and with performing first packetization again.

When a first communication link is set between the host OS 101 and the peripheral device 200, it is possible to allow the guest OS to share a link key generated at the time of setting a logical channel of the first communication link with the host OS. Therefore, the host OS 101 may reduce overhead caused by a performing the pairing procedure again in order to switch from the first communication link to the second communication link.

Figure 3:
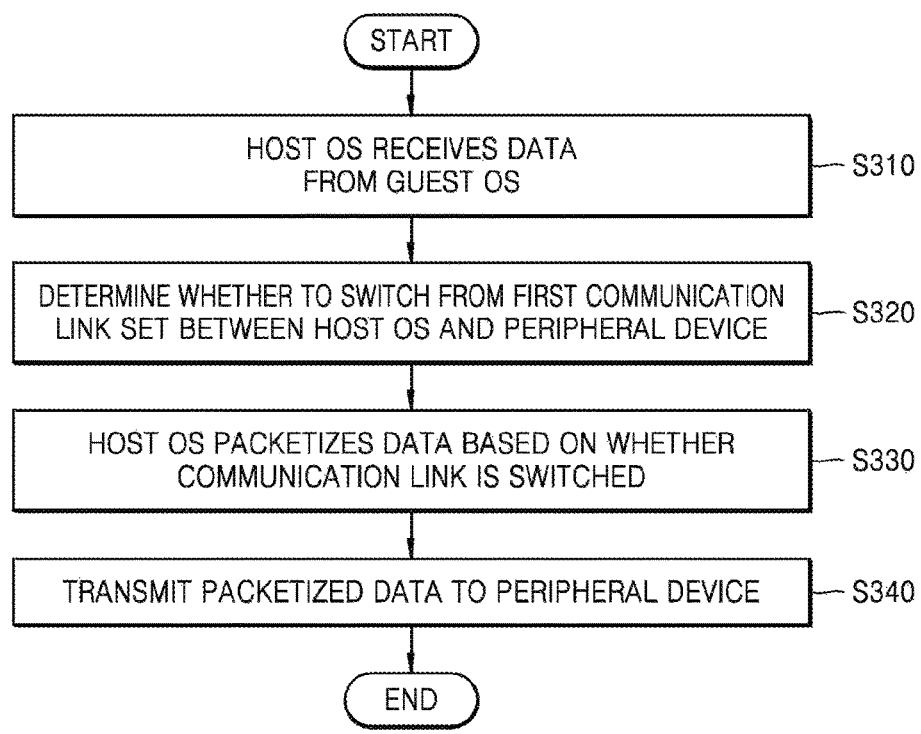
FIG. 3 is a flowchart illustrating an example method of communicating with a peripheral device in a host OS and a guest OS installed on an electronic device.

FIG. 3 is a flowchart illustrating an example method of communicating with the peripheral device 200 in the host OS 101 and the guest OS 102 installed on the electronic device 100.

Referring to FIG. 3, in operation S310, the host OS 101 may receive data from the guest OS 102.

According to an example embodiment, the guest OS 102 may determine whether a second communication link is set between the guest OS 102 and the peripheral device 200. When the second communication link is not set, the guest OS 102 may transmit data processed by the guest OS 102 to the hypervisor 103.

When the second communication link is set, the guest OS 102 may perform first packetization on data processed by the guest OS 102. In this example, the second communication link may share a link key with a first communication link. The data on which the first packetization has been performed may include an HCI packet. Accordingly, the guest OS 102 may transmit the data including the HCI packet to the hypervisor 103.

According to an example embodiment, data may be transmitted from the guest OS 102 to the host OS 101 through the hypervisor 103.

In operation S320, the host OS 101 may determine whether to switch from a communication link set between the host OS 101 and the peripheral device 200.

According to an example embodiment, the host OS 101 may determine whether to switch from the first communication link to the second communication link based on a format of data received from the guest OS 102.

For example, when the data received from the guest OS 102 includes an HCI packet, the host OS 101 may determine to switch from the first communication link to the second communication link.

When the data received from the guest OS 102 does not include an HCI packet, the host OS 101 may maintain the first communication link.

According to another example embodiment, the host OS 101 may determine whether to switch from the first communication link to the second communication link based on settings to determine whether the host OS 101 will share the peripheral device 200 with the guest OS 102.

For example, when the host OS 101 sets up a communication link with the peripheral device 200, the electronic device 100 may set that the host OS 101 shares the peripheral device 200 with the guest OS 102, or the host OS 101 exclusively uses the peripheral device 200. In this example, to share the peripheral device 200 with the guest OS 102 by the host OS 101 may, for example, refer to the situation in which data processed by the host OS 101 and the guest OS 102 is transmitted to the peripheral device 200 through the first communication link. Therefore, when it is set that the host OS 101 shares the peripheral device 200 with the guest OS 102, the host OS 101 may determine to maintain the first communication link.

To exclusively use the peripheral device 200 by the host OS 101 may, for example, refer to the situation in which data processed by the host OS 101 alone is transmitted to the peripheral device 200 through the first communication link. Therefore, when it is set that the host OS 101 exclusively uses the peripheral device 200, the guest OS 102 may transmit data to the peripheral device 200 through the first communication link. In this example, the host OS 101 may determine to switch from the first communication link to the second communication link.

FIG. 4 is a table illustrating an example in which settings to determine whether the host OS 101 will share the peripheral device 200 with the guest OS 102 is stored.

Referring to FIG. 4, the host OS 101 may store a table 410 including a setting value representing whether the host OS 101 will share the peripheral device 200 with the guest OS 102.

According to an example embodiment, when it is set that the host OS 101 shares a first peripheral device with the guest OS 102, the host OS 101 may store 'TRUE (0x1)' along with identification information of the first peripheral device. Also, when it is set that the host OS 101 exclusively uses a second peripheral device, the host OS 101 may store 'FALSE (0x0)' along with identification information of the second peripheral device.

Whether the host OS 101 will share the peripheral device 200 with the guest OS 102 may be set by a user or may be set automatically depending on characteristics of the peripheral device 200. For example, when a communication link is set between an audio device and the host OS 101, it may be set that that the host OS 101 will share the audio device with the guest OS 102.

When the guest OS 102 searches for a peripheral device, the host OS 101 may hide information on peripheral devices shared between the host OS 101 and the guest OS 102 from the guest OS 102. Therefore, the guest OS 102 may set the second communication link with peripheral devices which are set to be exclusively used by the host OS 101. A method of searching for peripheral devices in the guest OS 102 will be described in greater detail below with reference to FIGS. 13 to 18.

Referring again to FIG. 3, in operation S330, the host OS 101 may packetize data received from the guest OS 102 based on whether a communication link is switched. Also, in operation S340, the packetized data may be transmitted to the peripheral device 200.

According to an example embodiment, when the host OS 101 determines to maintain the first communication link, the host OS 101 may perform first packetization on the data received from the guest OS 102 based on a first link key which is stored in the host OS 101 and the peripheral device 200 at the time of setting the first communication link. The host OS 101 may perform second packetization. The host OS 101 may transmit the data on which the second packetization has been performed to the peripheral device 200 through the first communication link.

When the host OS 101 determines to switch from the first communication link to the second communication link, the host OS 101 may perform second packetization on the data received from the guest OS 102. In this example, the data received from the guest OS 102 may be data on which the first packetization has been performed by the guest OS 102. The host OS 101 may transmit the data on which the second packetization has been performed to the peripheral device 200 through the second communication link.

The data transmitted to the peripheral device 200 may, for example, be an asynchronous connectionless (ACL) packet or a synchronous connection orient (SCO) packet. The ACL packet may support one-to-one connection and may, for example, be transmitted based on the symmetric or asymmetric circuit switching scheme. The SCO packet may, for example, be transmitted based on the symmetric circuit switching scheme which is used mainly for voice.

Figure 5:
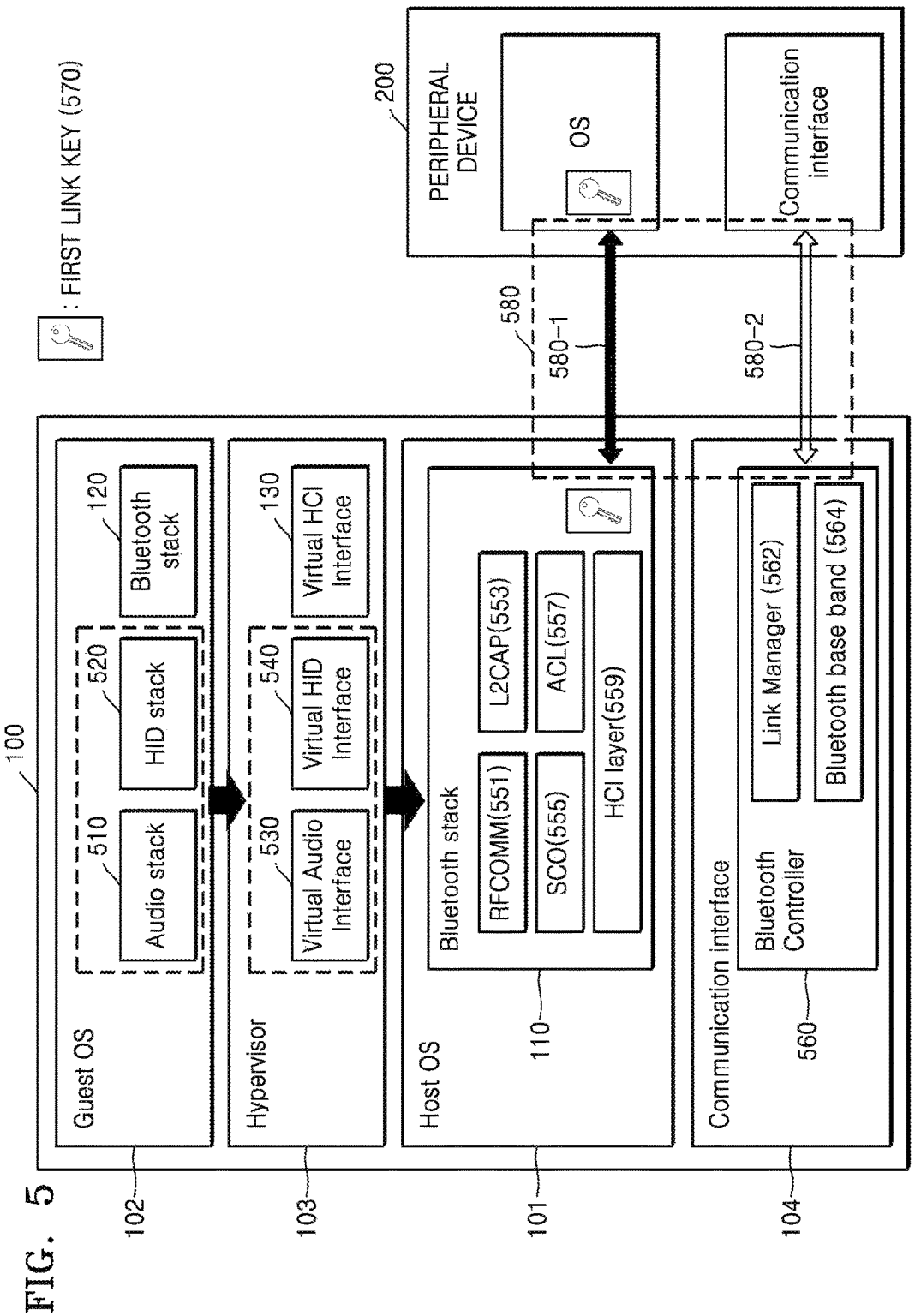
FIG. 5 is a diagram illustrating an example method of transmitting data processed by a guest OS to a peripheral device when a host OS maintains a first communication link.

FIG. 5 is a diagram illustrating an example method of transmitting data processed by the guest OS 102 to the peripheral device 200 when the host OS 101 maintains the first communication link.

Referring to FIG. 5, the host OS 101 may transmit and receive packets to and from the peripheral device 200 through a first communication link 580 including, for example, a logical channel 580-1 and a physical channel 580-2 which are controlled by the host OS 101.

According to an example embodiment, the host OS 101 may perform first packetization and second packetization on data processed in the host OS 101, based on a first link key 570 which is stored in the host OS 101 and the peripheral device 200 at the time of setting the first communication link 580. The host OS 101 may transmit the data on which the second packetization has been performed to the peripheral device 200.

For example, the guest OS 102 may transmit audio data or human interface device (HID) data processed by the guest OS 102 to the hypervisor 103 through an audio stack 510 and an HID stack 520. The hypervisor 103 may transmit the received audio data or HID data to the host OS 101 through a virtual audio interface 530 or a virtual HID interface 540.

According to an example embodiment, the host OS 101 may determine to maintain the first communication link 580 when the audio data or the HID data received from the guest OS 102 does not include an HCI packet.

According to another example embodiment, the host OS 101 may determine whether the host OS 101 shares the peripheral device 200 with the guest OS 102 based, for example, on the table 410 (FIG. 4) stored in the host OS 101. When the host OS 101 shares the peripheral device 200 with the guest OS 102, the host OS 101 may determine to maintain the first communication link.

The host OS 101 may perform first packetization on the audio data or the HID data received from the guest OS 102. For example, when the peripheral device 200 is a Bluetooth audio device or a Bluetooth HID device, the host OS 101 may perform authentication with the peripheral device 200 using the first link key 570. When authentication is completed, the host OS 101 may perform first packetization on the audio data or the HID data through protocol layers, such as a radio frequency communications (RFCOMM) layer 551, a logical link control and adaptation protocol (L2CAP) layer 553, a synchronous connection-oriented (SCO) layer 555, an asynchronous connection-oriented logical (ACL) layer 557, an HCI layer 559, and the like in a Bluetooth stack 110. When the first packetization is complete, the host OS 101 may transmit the audio data or the HID data having an HCI packet format to the communication interface 104.

According to an example embodiment, the host OS 101 may perform second packetization on the audio data or the HID data transmitted in the HCI packet format by controlling the communication interface 104. In this example, the second packetization may be based on physical characteristics of the first communication link 580. For example, the host OS 101 may perform second packetization on the audio data or the HID data through a Bluetooth controller 560 including a link manager 562, a Bluetooth base band 564, and the like.

Figure 6:
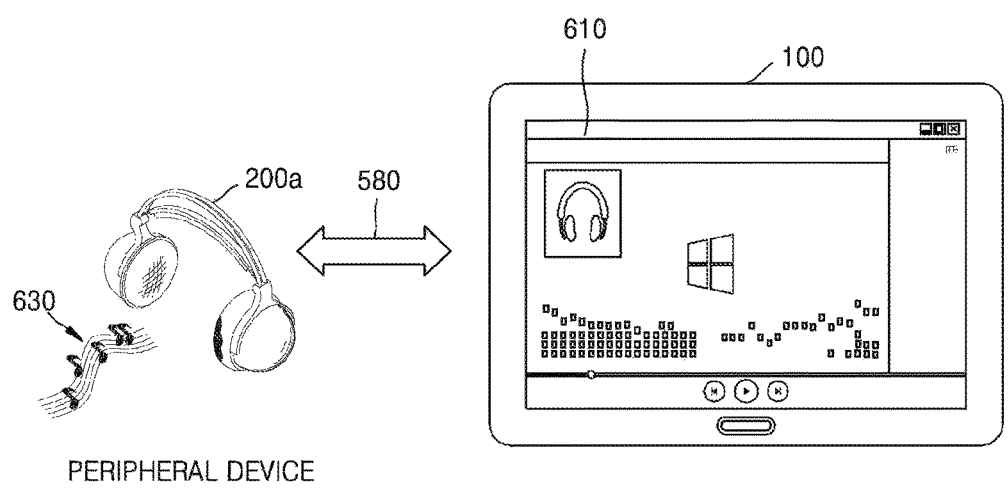
FIG. 6 is a diagram illustrating an example in which a host OS transmits data received from a guest OS to a first peripheral device.

FIG. 6 is a diagram illustrating an example in which the host OS 101 transmits data received from the guest OS 102 to a first peripheral device 200*a*.

Referring to FIG. 6, the electronic device 100 may display an operation screen of the guest OS 102 on a screen of the electronic device 100. For example, the electronic device 100 may display an execution screen 610 of a music play application executed in the guest OS 102 on the screen of the electronic device 100. In this example, the first peripheral device 200*a* may be set to be shared with the guest OS 102 by the host OS 101 and may be in a connected state to the host OS 101 through the first communication link 580.

For example, the guest OS 102 may transmit audio data processed in the music play application to the host OS 101. The host OS 101 may perform first packetization and second packetization based on table 410 of FIG. 4, in order to transmit the audio data to the first peripheral device 200*a*. According to an example embodiment, the audio data packetized by the host OS 101 may be output through the first peripheral device 200*a* (630).

Figure 7:
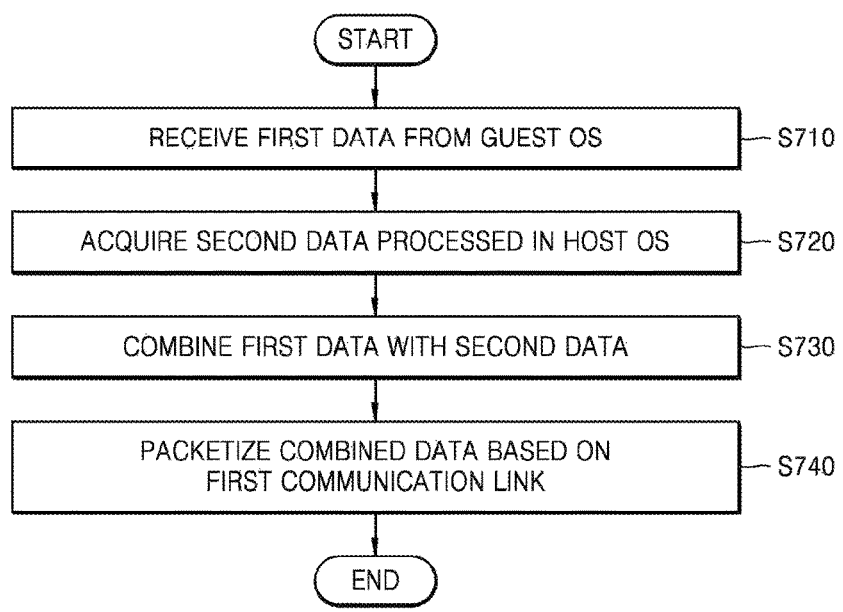
FIG. 7 is a flowchart illustrating an example method of transmitting data received from a guest OS and data processed by a host OS to the peripheral device in the host OS.

FIG. 7 is a flowchart illustrating an example method of transmitting data received from the guest OS 102 and data processed by the host OS 101 to the peripheral device 200 in the host OS.

Referring to FIG. 7, in operation S710, the host OS 101 may receive first data from the guest OS 102. For example, when a second communication link is not set between the guest OS 102 and the peripheral device 200, the guest OS 102 may transmit first audio data or first HID data, which does not include an HCI packet, to the hypervisor 103.

In operation S720, the host OS 101 may acquire second data processed in the host OS 101. For example, the host OS 101 may acquire second audio data or second HID data.

In operation S730, the host OS 101 may combine the first data with the second data.

According to an example embodiment, the host OS 101 may, for example, combine the first data with the second data in a service layer of the host OS 101. For example, the host OS 101 may combine the first audio data with the second audio data in an audio service layer. The host OS 101 may combine the first HID data with the second HID data in an HID service layer.

In operation S740, the host OS 101 may perform packetization on the combined data based on a first communication link.

According to an example embodiment, the host OS 101 may authenticate the peripheral device 200 based on a first link key, which is stored in the host OS 101 and the peripheral device 200 at the time of setting the first communication link. When authentication is completed, the host OS 101 may perform first packetization and second packetization on the combined data.

The host OS 101 may transmit the combined data, on which the first packetization and the second packetization, to the peripheral device 200.

Figure 8:
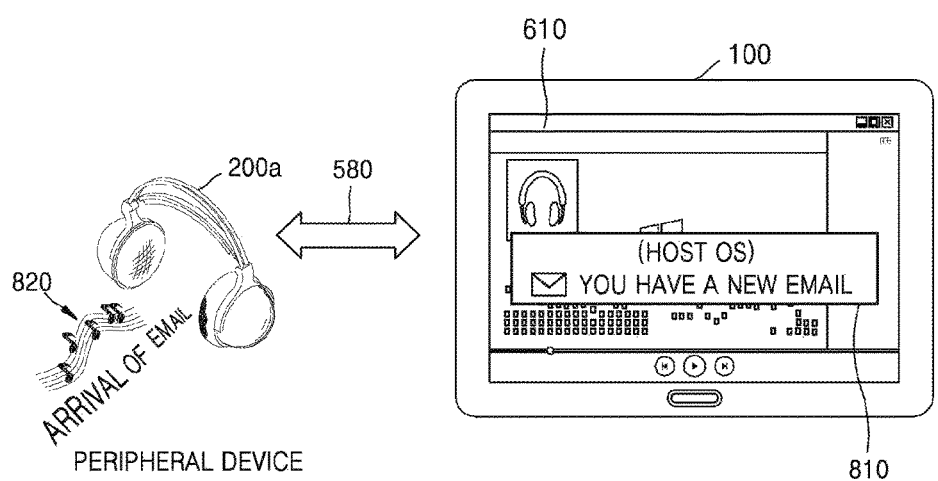
FIG. 8 is a diagram illustrating an example in which a host OS transmits data received from a guest OS and data processed by a host OS to a first peripheral device.

FIG. 8 is a diagram illustrating an example in which the host OS 101 transmits data received from the guest OS 102 and data processed by the host OS 101 to the first peripheral device 200*a*.

Referring to FIG. 8, the electronic device 100 may display an execution screen 610 of a music play application executed in the guest OS 102 on the screen of the electronic device 100 as in FIG. 6. In this example, the first peripheral device 200*a* may be set to be shared with the guest OS 102 by the host OS 101 and may be in a connected state to the host OS 101 through the first communication link 580.

For example, the guest OS 102 may transmit first audio data processed in the music play application to the host OS 101. When an email is received by the host OS 101, the host OS 101 may generate a notification window 810 and an notification signal (e.g., second audio data) which represent that the email is received.

The host OS 101 may combine the first audio data received from the guest OS 102 with second audio data generated by the host OS 101. The host OS 101 may perform first packetization and second packetization on the combined data.

The first peripheral device 200*a* may receive the combined data from the electronic device and output the combined data. Therefore, a user may be provided with audio data generated by the host OS 101 and the guest OS 102 seamlessly.

Figure 9:
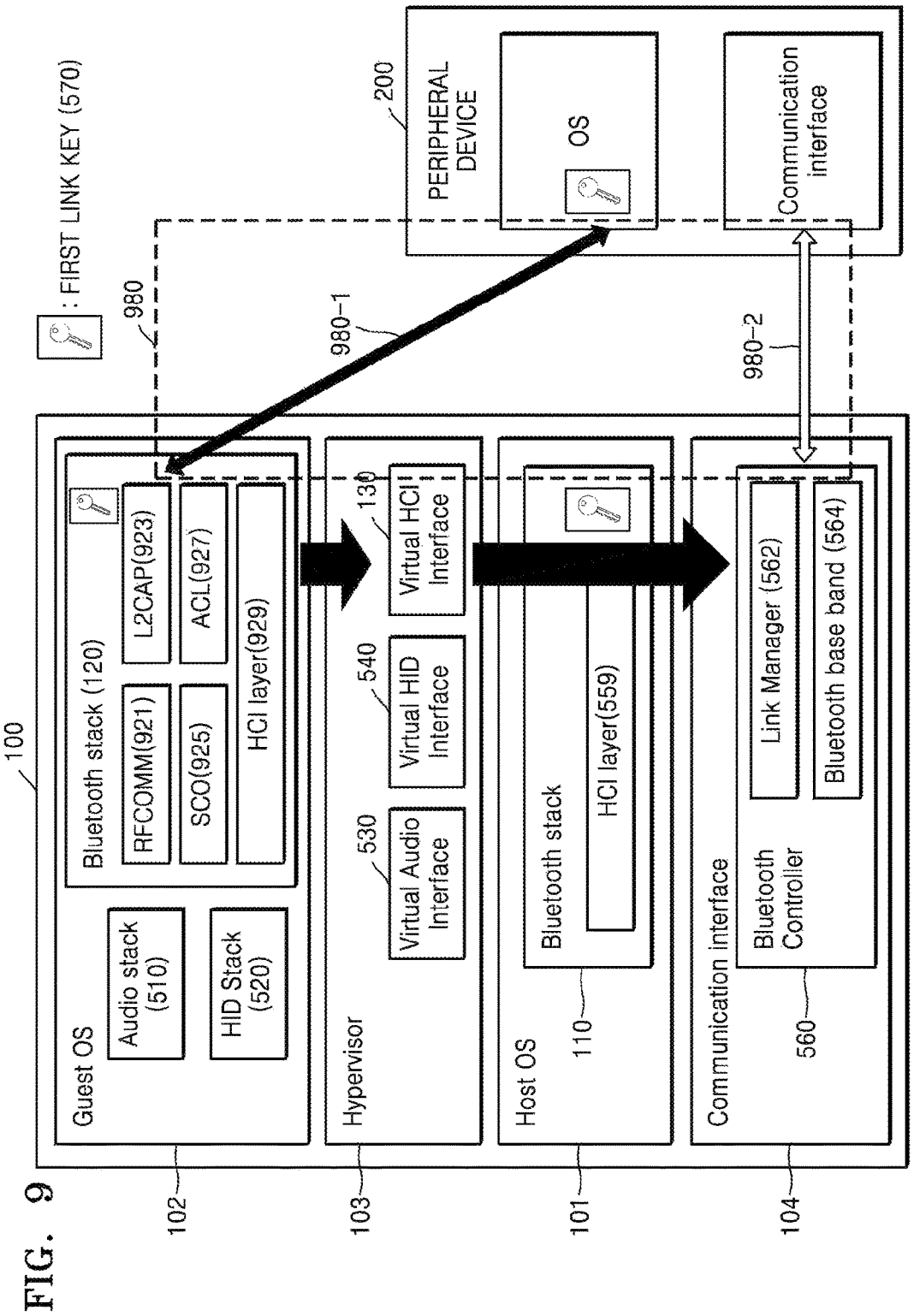
FIG. 9 is a diagram illustrating an example method of transmitting data processed by a guest OS to a peripheral device when a host OS switches from a first communication link.

FIG. 9 is a diagram illustrating an example method of transmitting data processed by the guest OS 102 to the peripheral device 200 when the host OS 101 switches from a first communication link.

Referring to FIG. 9, the guest OS 102 may transmit and receive packets through a second communication link 980 including a logical channel 980-1 controlled by the guest OS 102 and a physical channel 980-2 controlled by the host OS 101.

According to an example embodiment, the guest OS 102 may share a first link key 570 stored in the host OS 101 and the peripheral device 200 at the time of setting the second communication link 980. For example, the guest OS 102 may request the link key from the host OS 101, the link key being stored in the host OS 101 and the peripheral device 200 at the time of setting the second communication link 980. In this manner, the electronic device 100 may switch from the first communication link to the second communication link without again performing pairing between the guest OS 102 and the peripheral device 200.

According to an example embodiment, since the second communication link is set, the guest OS 102 may perform first packetization on data processed in the guest OS 102. For example, the guest OS 102 may perform authentication with the peripheral device 200 using the first link key 570. When authentication is completed, the host OS 101 may perform first packetization on data through protocol layers, such as an RFCOMM layer 921, an L2CAP layer 923, an SCO layer 925, an ACL layer 927, an HCI layer 929, and the like in a Bluetooth stack 120 of the guest OS 102. When the first packetization is completed, the guest OS 102 may transmit data having an HCI packet format to the hypervisor 103.

According to an example embodiment, the virtual HCI interface 130 of the hypervisor 103 may transmit the received data having an HCI packet format to the host OS 101.

According to an example embodiment, the host OS 101 may determine to switch from the first communication link to the second communication link 980 when the data received from the guest OS 102 includes an HCI packet.

According to another example embodiment, the host OS 101 may determine whether the host OS 101 shares the peripheral device 200 with the guest OS 102 based, for example, on table 410 of FIG. 4 stored in the host OS 101. When the host OS 101 exclusively uses the peripheral device 200, the host OS 101 may determine to switch from the first communication link to the second communication link.

According to an example embodiment, when it is determined to switch communication links, the host OS 101 may provide data received from the guest OS 102 through the HCI layer 559 in the Bluetooth stack 110 of the host OS 101 to the communication interface 104.

According to an example embodiment, the communication interface 104 may perform second packetization on data transmitted in an HCI packet format under the control of the host OS 101. In this example, the second packetization may be based on physical characteristics of the second communication link 980, and the physical characteristics of the second communication link 980 may be substantially equal to or similar to those of the first communication link 580. For example, the communication interface 104 may perform second packetization on the audio data or the HID data through a Bluetooth controller 560 including a link manager 562, a Bluetooth base band 564, and the like.

As described above, when switching from the first communication link to the second communication link is performed in the electronic device 100, the link key stored in the host OS 101 and the peripheral device 200 may be shared with the guest OS 102, reducing overhead caused by switching of communication links.

Figure 10A:
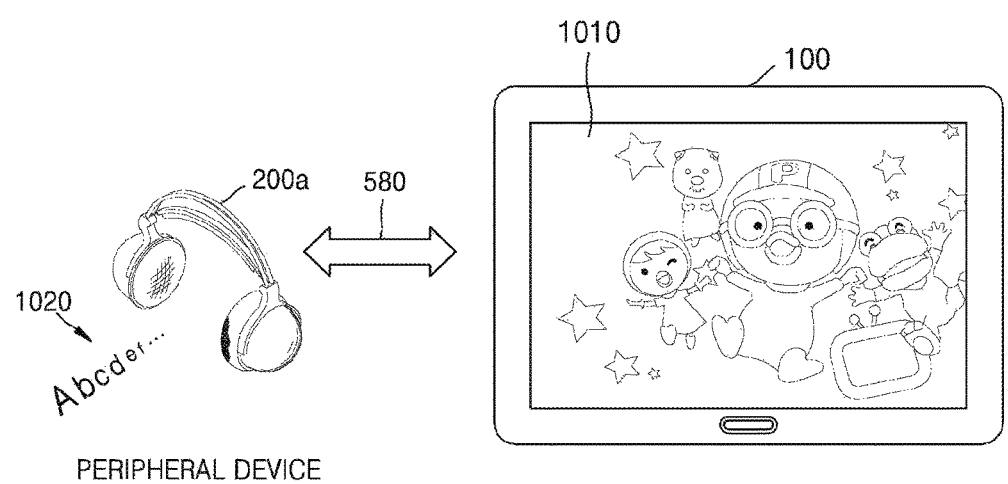
FIGS. 10A and 10B are diagrams illustrating an example in which a host OS transmits data processed by a guest OS to a peripheral device when the host OS switches from a first communication link.
Figure 10B:
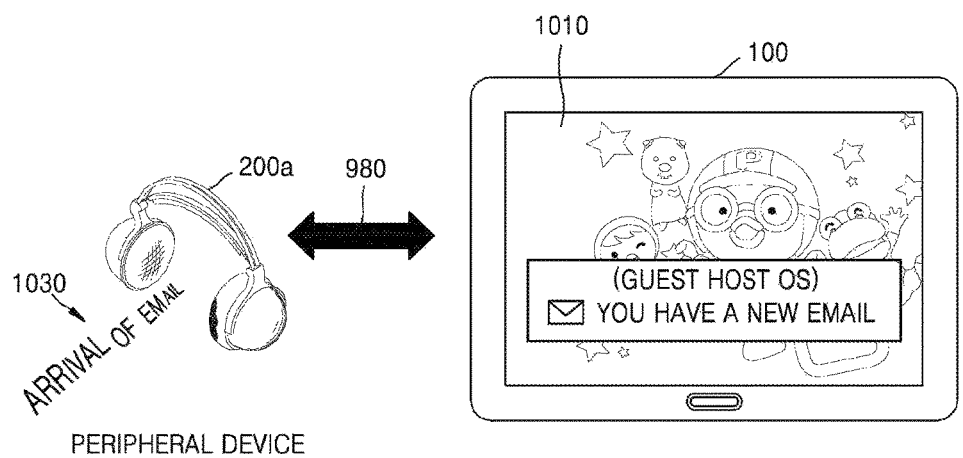

FIGS. 10A and 10B are diagrams illustrating an example in which the host OS 101 transmits data processed by the guest OS 102 to the peripheral device 200 when the host OS 101 switches from a first communication link.

Referring to FIGS. 10A and 10B, the electronic device 100 may display an operation screen of the host OS 101 on a screen of the electronic device 100.

As illustrated in FIG. 10A, for example, the electronic device 100 may display an execution screen 1010 of a video application executed in the host OS 101 on the screen of the electronic device 100. In this example, the first peripheral device 200a may be exclusively used by the host OS 101, and may be in a connected state to the host OS 101 through the first communication link 580. The host OS 101 may perform first packetization and second packetization on first audio data processed by the video application. The host OS 101 may transmit the first audio data on which the packetization has been performed to the first peripheral device 200a through the first communication link 580. The first peripheral device 200a may output a first audio signal 1020 corresponding to the first audio data.

According to an example embodiment, the host OS 101 may receive second audio data from the guest OS 102. For example, as illustrated in FIG. 10B, when an email is received by the guest OS 102, the host OS 101 may receive second audio data corresponding a notification signal representing that the email is received from the guest OS 102. In this example, the second audio data may be data on which the first packetization has been performed based on the second communication link 980.

When receiving the second audio data from the guest OS 102, the host OS 101 may determine to switch from the first communication link to the second communication link. The host OS 101 may stop packetization of the first audio data and perform second packetization on the second audio data.

The first peripheral device 200a may receive the second audio signal from the electronic device 100 and output a second audio signal 1030 corresponding to the second audio data.

Figure 11:
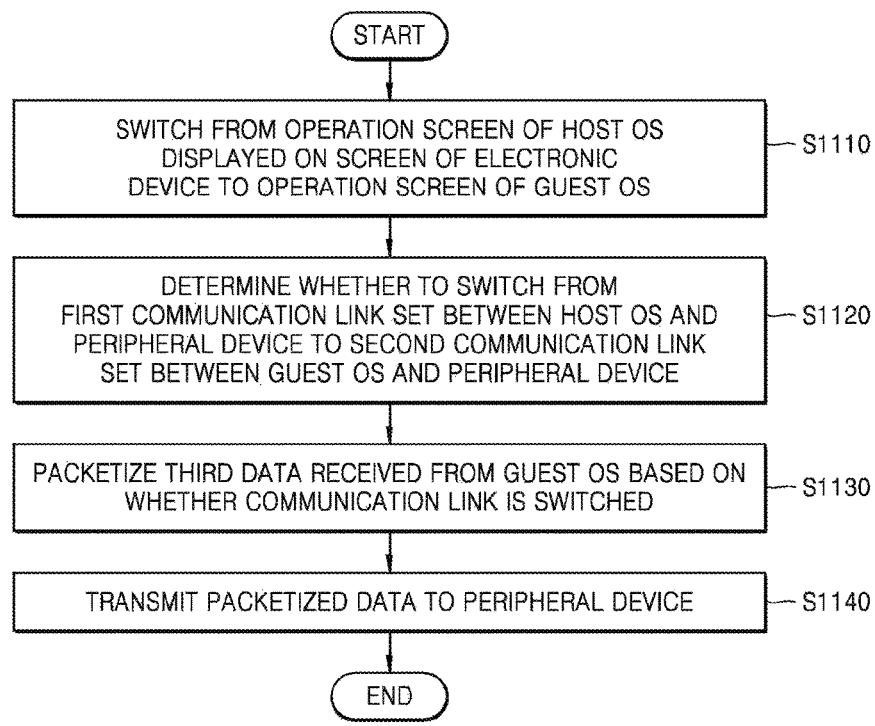
FIG. 11 is a flowchart illustrating an example method of communicating with a peripheral device in a host OS and a guest OS installed on an electronic device.

FIG. 11 is a flowchart illustrating an example method of communicating with the peripheral device 200 in the host OS 101 and the guest OS 102 installed on the electronic device 100.

Referring to FIG. 11, in operation S1110, the electronic device 100 may switch from an operation screen of the host OS 101 displayed on a screen of the electronic device 100 to an operation screen of the guest OS 102.

According to an example embodiment, the electronic device 100 may switch from the operation screen of the host OS 101 displayed on the screen of the electronic device 100 to the operation screen of the guest OS 102 based, for example, on a user input received from a user.

When data processed by the guest OS 102 is transmitted to the host OS 101, the electronic device 100 may switch from the operation screen of the host OS 101 displayed on the screen of the electronic device 100 to the operation screen of the guest OS 102. When the host OS 101 does not execute an application for a predetermined time period, the electronic device 100 may switch from the operation screen of the host OS 101 displayed on the screen of the electronic device 100 to the operation screen of the guest OS 102.

In operation S1120, the host OS 101 may determine whether to switch from a first communication link set between the host OS 101 and the peripheral device 200 to a second communication link set between the guest OS 102 and the peripheral device 200.

According to an example embodiment, the host OS 101 may determine whether to switch from the first communication link based on settings as to the use of the peripheral device 200 of the host OS 101 and the guest OS 102.

For example, when the host OS 101 sets up a communication link with the peripheral device 200, the electronic device 100 may set that the host OS 101 shares the peripheral device 200 with the guest OS 102, or the host OS 101 exclusively uses the peripheral device 200. In this example, to share the peripheral device 200 with the guest OS 102 may, for example, refer to the situation in which data processed by the host OS 101 and the guest OS 102 is transmitted to the peripheral device 200 through the first communication link. Therefore, when it is set that the host OS 101 shares the peripheral device 200 with the guest OS 102, the host OS 101 may determine to maintain the first communication link.

Exclusive usage of the peripheral device 200 by the host OS 101 may, for example, refer to the situation in which data processed by the host OS 101 alone is transmitted to the peripheral device 200 through the first communication link. Therefore, when it is set that the host OS 101 exclusively uses the peripheral device 200, the host OS 101 may determine to switch from the first communication link to the second communication link.

In operation S1130, the host OS 101 may packetize data received from the guest OS 102 based on whether a communication link is switched. In operation S1140, the host OS 101 may transmit the packetized data to the peripheral device 200.

According to an example embodiment, when the host OS 101 determines to maintain the first communication link, the host OS 101 may perform first packetization and second packetization on the data received from the guest OS 102 based on a first link key which is stored in the host OS 101 and the peripheral device 200 at the time of setting the first communication link. The host OS 101 may transmit data on which the second packetization has been performed to the peripheral device 200 through the first communication link.

When the host OS 101 determines to switch from the first communication link to the second communication link, the host OS 101 may perform second packetization on the data received from the guest OS 102. In this example, the data received from the guest OS 102 may be data on which the first packetization has been performed by the guest OS 102. The host OS 101 may transmit the data on which the second packetization has been performed to the peripheral device 200 through the second communication link.

Although it is described above that switching from the operation screen of the host OS 101 to the operation screen of the guest OS 102 is performed, example embodiments are not limited thereto. For example, it is possible to switch the operation screen of the guest OS 102 to the operation screen of the host OS 101.

In this example, the host OS 101 may suspend the guest OS 102 and transmit data processed by the host OS 101 to the peripheral device 200 through the first communication link. Suspending of the guest OS 102 by the host OS 101 may include, for example, generating of a snapshot image for the last execution environment of the guest OS 102 before the screen of the electronic device 100 is switched. In this example, according to an example embodiment, the host OS 101 may generate a snapshot image which does not include a Bluetooth driver state of the guest OS 102 (for example, connection states between the guest OS 102 and peripheral devices therebetween which communication links are set). Therefore, the host OS 101 may reduce time which is taken for the host OS 101 to suspend the guest OS 102.

Figure 12A:
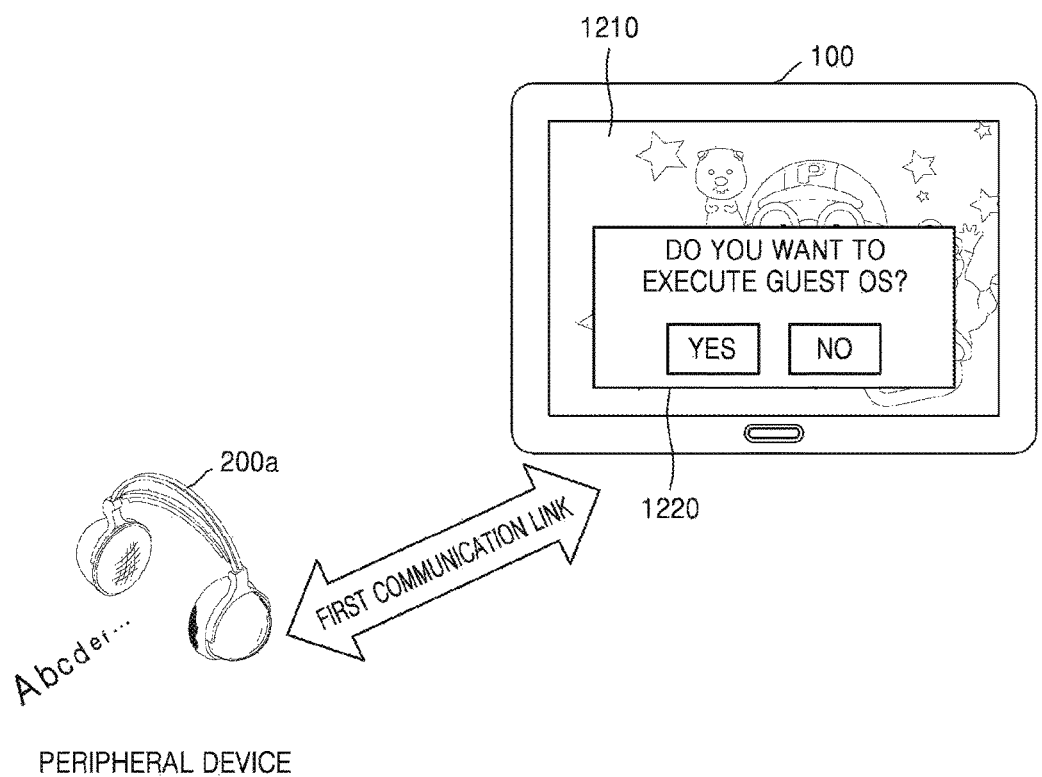
FIGS. 12A and 12B are diagrams illustrating an example in which switching from an operation screen of a host OS displayed on a screen of an electronic device to an operation screen of a guest OS is performed.
Figure 12B:
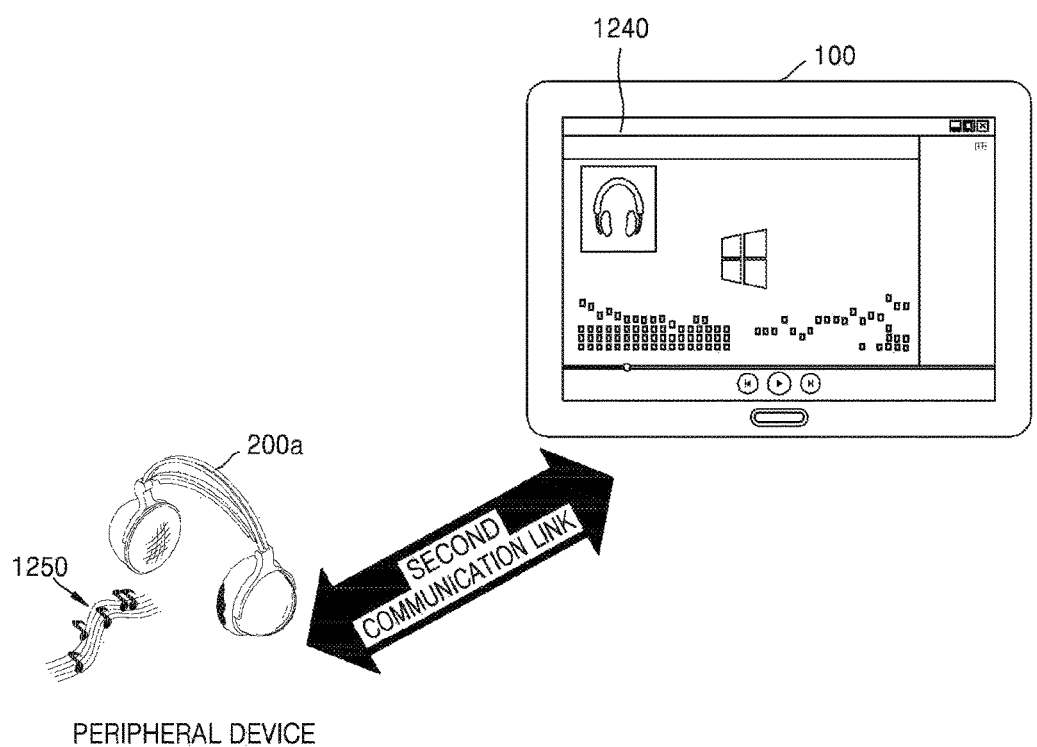

FIGS. 12A and 12B are diagrams illustrating an example in which switching from the operation screen of the host OS 101 displayed on the screen of the electronic device 100 to the operation screen of the guest OS 102 is performed.

Referring to FIG. 12A, the electronic device 100 may display an operation screen of the host OS 101 on a screen of the electronic device 100. For example, the electronic device 100 may display an execution screen 1210 of a video application executed in the host OS 101 on the screen of the electronic device 100. Audio data processed in the video application executed by the host OS 101 may be output from a first peripheral device 200*a* through a first communication link.

According to an example embodiment, the electronic device 100 may provide a graphics user interface (GUI) 1220 for switching from the operation screen of the host OS 101 to the operation screen of the guest OS 102. Also, as illustrated in FIG. 12B, the electronic device 100 may switch from the operation screen of the host OS 101 to the operation screen of the guest OS 102 based on a user input provided through GUI 1220.

Referring to FIG. 12B, the electronic device 100 may display an execution screen of an application lastly executed in the guest OS 102 on the screen of the electronic device 100. For example, the electronic device 100 may display an execution screen 1240 of a music play application which was last executed in the guest OS 102 on the screen of the electronic device 100.

The guest OS 102 may transmit audio data processed in the music play application to the host OS 101. When the second communication channel is set, the guest OS 102 may perform first packetization on the audio data based on whether a second communication link is set.

The host OS 101 may determine whether to switch from the first communication link to the second communication link.

According to an example embodiment, when the host OS 101 determines to switch from the first communication link to the second communication link, the host OS 101 may perform second packetization on the audio data received from the guest OS 102. The host OS 101 may transmit the packetized data 1250 to the first peripheral device 200*a*.

Figure 13:
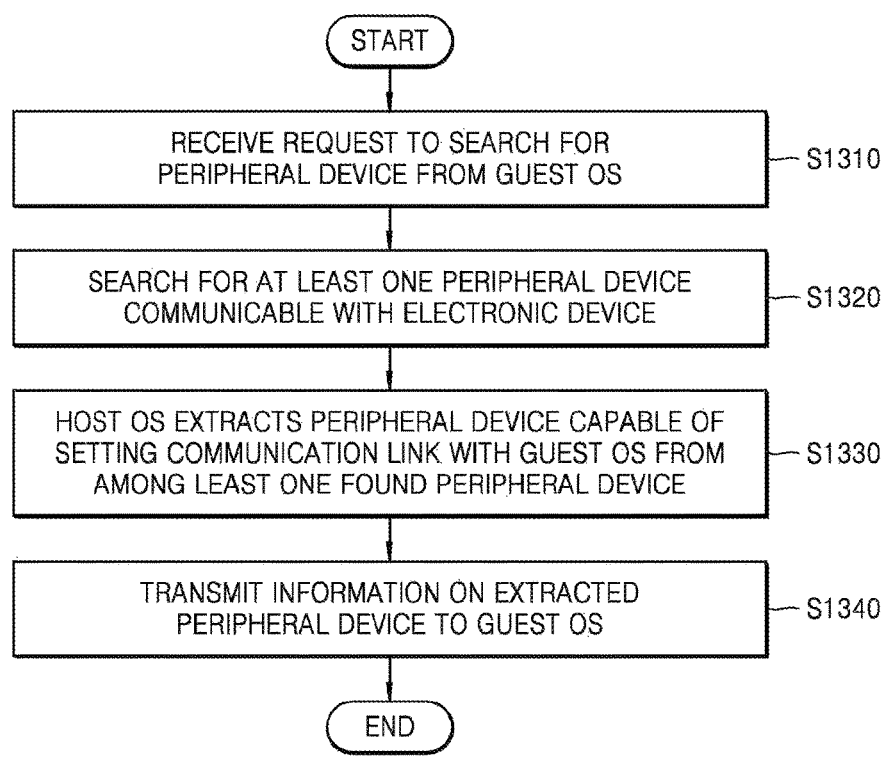
FIG. 13 is a flowchart illustrating an example method of searching for peripheral devices of the guest OS installed on an electronic device.

FIG. 13 is a flowchart illustrating an example method of searching for peripheral devices in the guest OS 102 installed on the electronic device.

Referring to FIG. 13, in operation S1310, the host OS 101 installed on the electronic device 100 may receive an inquiry to search for peripheral devices from the guest OS.

According to an example embodiment, the guest OS 102 may periodically request the host OS 101 to search for peripheral devices. The guest OS 102 may periodically request the host OS 101 to search for peripheral devices in response to a user input received from a user.

Figure 14:
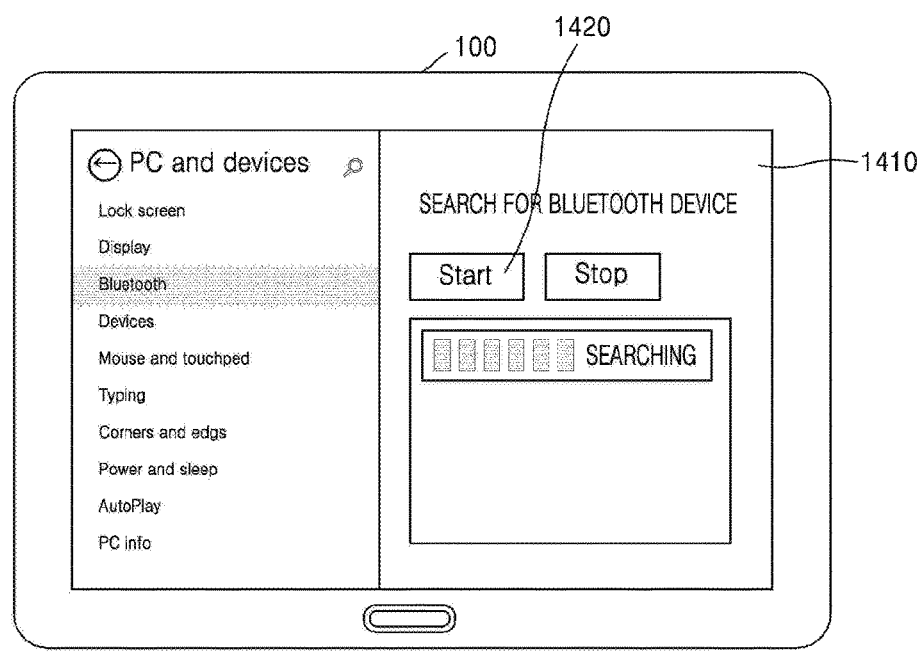
FIG. 14 is a diagram illustrating an example in which a request to search for peripheral devices is generated through settings in a guest OS.

FIG. 14 is a diagram illustrating an example in which a request to search for peripheral devices is generated through settings in the guest OS 102.

Referring to FIG. 14, the electronic device 100 may display a search page 1410 in the settings of the guest OS 102, which allows a user to direct search of Bluetooth peripheral devices, on the display of the electronic device 100.

According to an example embodiment, the search page 1410 may include a GUI (for example, a 'start' button 1420) which allows the user to start search of the Bluetooth peripheral devices capable of transmitting and receiving data to and from the guest OS 102.

When receiving a user input from the GUI 1420 included in the search page 1410, the guest OS 102 may transmit data requesting search of Bluetooth peripheral devices to the host OS 101.

Referring again to FIG. 13, in operation S1320, the host OS 101 may search for peripheral devices communicable with the electronic device 100 when the data requesting search is received from the guest OS 102.

Figure 15:
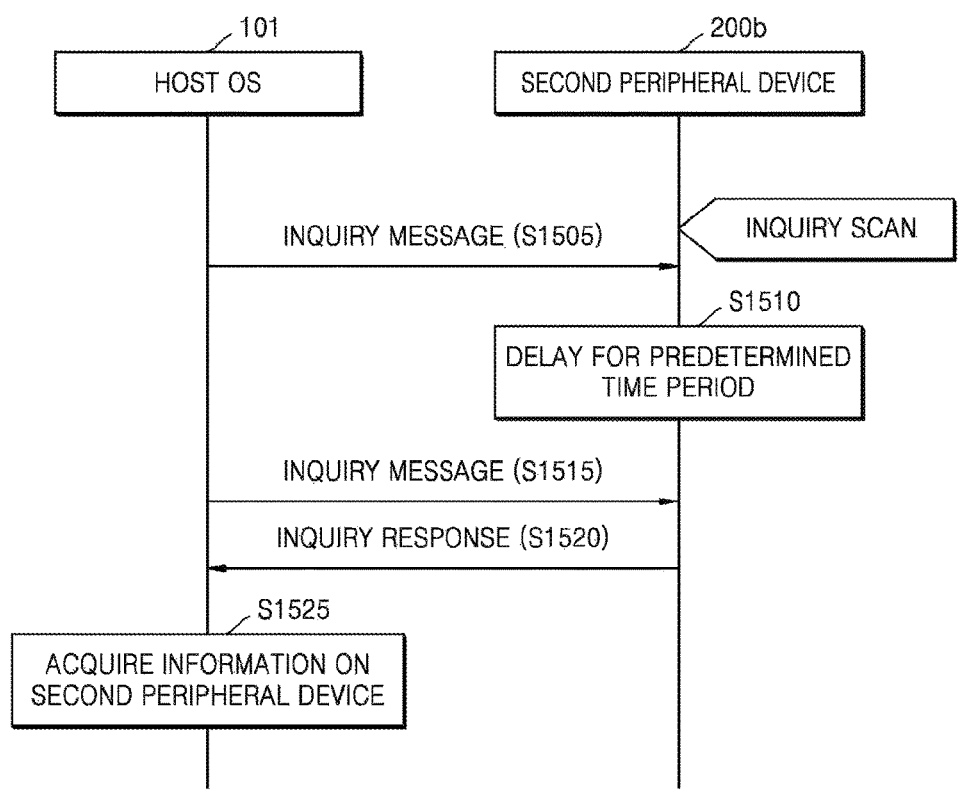
FIG. 15 is a sequence diagram illustrating an example method of searching for peripheral devices around an electronic device in the host OS.

FIG. 15 is a sequence diagram illustrating an example method of searching for peripheral devices 200 around the electronic device 100 in the host OS 101.

Referring to FIG. 15, when a request to search for peripheral devices is received from the guest OS 102 by the host OS 101, the host OS 101 of the electronic device 100 may transmit an inquiry message to unspecified peripheral devices.

When a device that is in an inquiry scan state receives the inquiry message, the device may delay transmission of an inquiry reply for a predetermined time period (for example, 0 to 640 ms). When receiving the inquiry message again, the device may transmit an inquiry reply (for example, a frequency hopping synchronization (FHS) packet including information on the device itself) to the electronic device which has transmitted the inquiry message. In this example, the reason for time delay of 0 to 640 ms is that, since the inquiry message includes an inquiry access code so as to be listened by all devices, a plurality of devices which have received the inquiry message immediately transmit the inquiry replies without time delay, resulting in collision of the inquiry replies.

According to an example embodiment, the host OS 101 may transmit an inquiry message S1505 to a second peripheral device 200*b* which starts inquiry scan. When the second peripheral device 200*b* receives the inquiry message from the electronic device 100, the second peripheral device 200*b* may delay an inquiry reply for a predetermined time period (S1510). When the second peripheral device 200*b* again receives the inquiry message from the electronic device 100 (S1515), the second peripheral device 200*b* may transmit an inquiry response including information on the second peripheral device 200*b* itself to the electronic device 100 (S1520).

The host OS 101 may acquire the information on the second peripheral device 200b by receiving the inquiry response (S1525). For example, the host OS 101 may acquire information on a MAC address of the second peripheral device 200b.

Referring again to FIG. 13, in operation S1330, the host OS 101 may extract a peripheral device capable of setting a communication link with the guest OS 102 from among found peripheral devices.

According to an example embodiment, the host OS 101 may extract a peripheral device, which has not set a communication link with the host OS 101, from among the found peripheral devices.

The host OS 101 may extract a peripheral device, which has set a communication link with the host OS 101 and is set to be exclusively used by the host OS 101, from among the found peripheral devices. For example, the host OS 101 may determine whether the peripheral device found from the table 410 illustrated in FIG. 4 is set to be exclusively used by the host OS 101.

In this example, according to an example embodiment, the host OS 101 may not extract information on peripheral devices which is shared with the guest OS 102 by the host OS 101 from among the found peripheral devices. The reason for this may be to allow the host OS 101 not to set a second communication link with a certain peripheral device (that is, a peripheral device set to be shared by the host OS). Therefore, the guest OS 102 may transmit data including no HCI packet to the host OS 101 like the exemplary embodiments described with reference to FIGS. 3 to 8.

In operation S1340, the host OS 101 may transmit information on the extracted peripheral device to the guest OS 102.

Figure 16A:
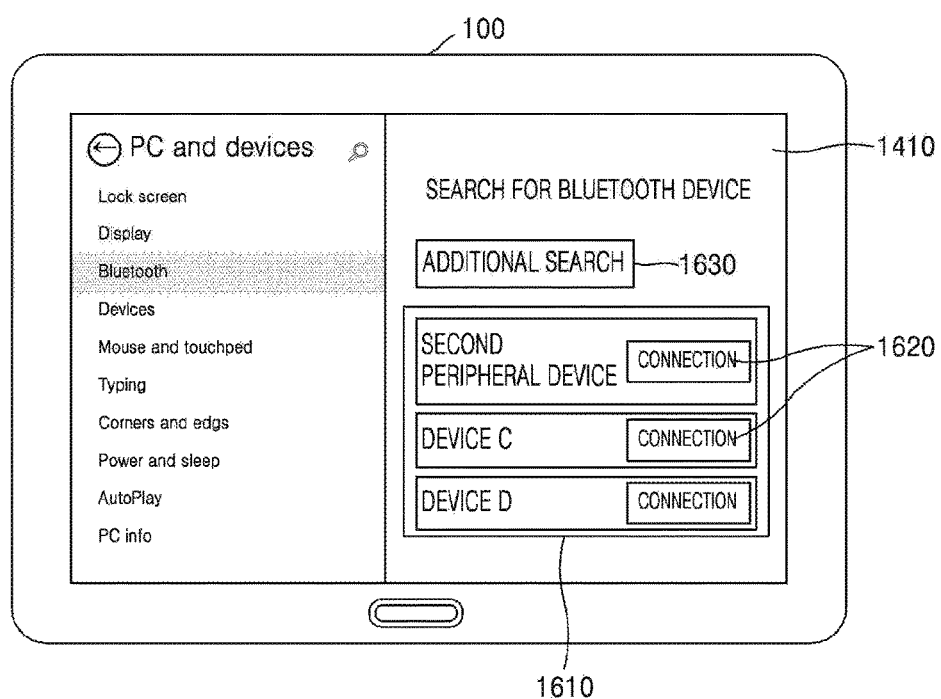
FIGS. 16A and 16B are diagrams illustrating an example in which a guest OS displays information on a peripheral device extracted by a host OS.
Figure 16B:
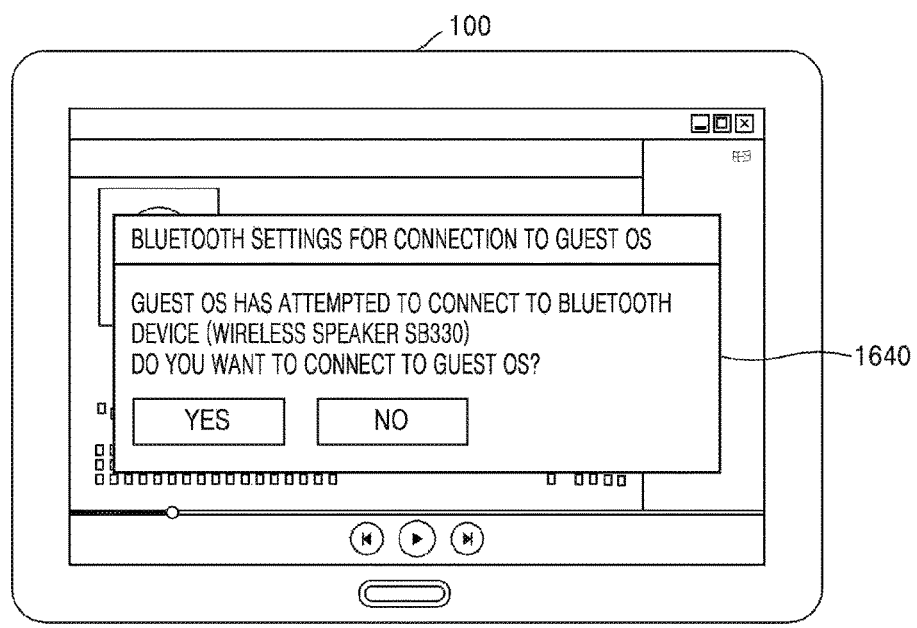

FIGS. 16A and 16B are diagrams illustrating an example in which the guest OS 102 displays information of a peripheral device extracted by the host OS 101.

Referring to FIG. 16A, the guest OS 102 may display information on peripheral devices capable of setting a communication link with the guest OS 102, through the search page 1410 (FIG. 14) which allows the user to search, for example, for Bluetooth peripheral devices. The information on the peripheral devices displayed on the search page 1410 may include identification information of the peripheral devices found and extracted by the host OS 101.

The guest OS 102 may provide a connection selecting GUI 1610 (a "connection" button image 1620) which allows a user to select a peripheral device which is to set a communication link with the guest OS 102 from among the peripheral devices displayed on the search page 1410. When a user input for the connection selecting GUI 1620 is received, the guest OS 102 may set a communication link between a peripheral device corresponding to a selected GUI (for example, the second peripheral device 200b) and the guest OS 102.

The guest OS 102 may provide a further search GUI (an "additional search" button image) 1630 for allowing the user to select additional search for a peripheral device on the search page 1410. When the user selects the additional search GUI 1630, the guest OS 102 may again transmit a request to search for peripheral devices to the host OS 101.

Referring to FIG. 16B, when the guest OS 102 periodically requests the host OS 101 to search for peripheral devices, the guest OS 102 may provide the user with information on the peripheral devices found by the host OS 101 through a pop-up window 1640.

Figure 17:
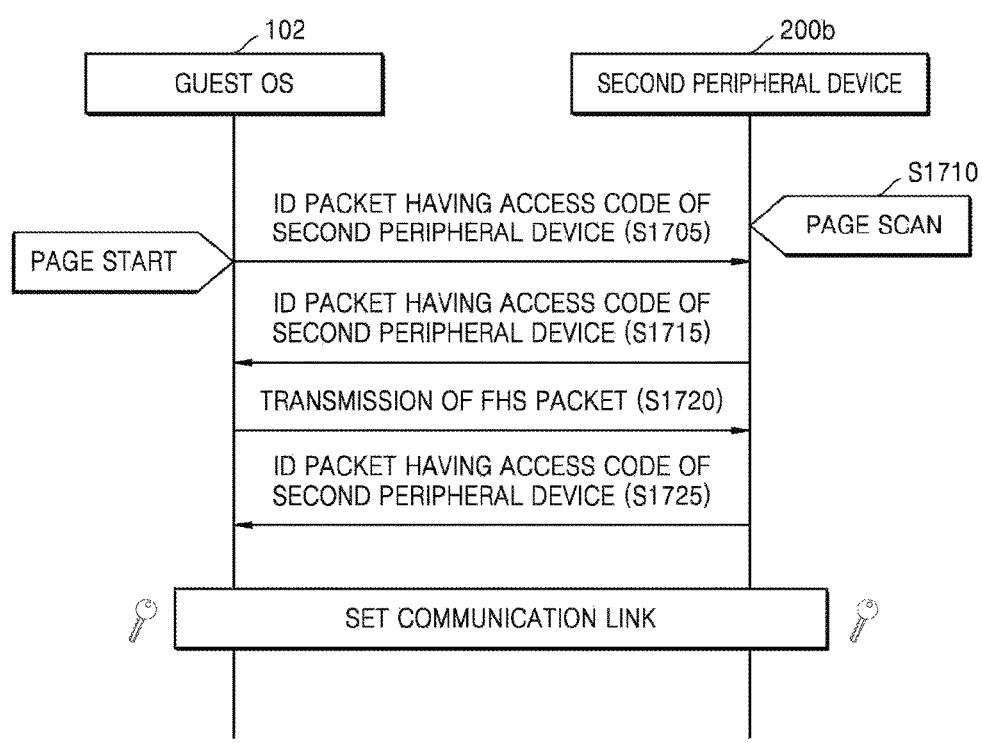
FIG. 17 is a sequence diagram illustrating an example method of setting a communication link between the electronic device and a second peripheral device.

FIG. 17 is a sequence diagram illustrating an example method of setting a communication link between the electronic device 100 and the second peripheral device 200b.

Referring to FIG. 17, the guest OS 102 of the electronic device 100 may perform a page procedure for setting a second communication link with a peripheral device which has not set a first communication link with the host OS 101.

Page/page scan may be performed similarly to execution of inquiry/inquiry scan in FIG. 15. In order for one device to set a communication link with a certain device, the device may enter a page mode, and transmit a page message (for example an ID packet having an access code of a counterpart device) to a counterpart device. When the counterpart device is in a page scan state and receives the page message, the device and the counterpart device may be connected to each other. A difference between the inquiry and the page is that the inquiry is used to acquire information on a device and an inquiry response is received from all devices, but the page is used to transmit a message to a certain device and a page response is immediately received without time delay. Therefore, time taken for the page procedure may be less than time taken for the inquiry procedure. Generally, a device performing the page procedure may become a master and a device performing page scan may become a slave in, for example, a piconet. Two devices which have experienced the paging procedure may store a link key therebetween. The stored link key may be used for authentication between devices or the like.

Referring to FIG. 17, the guest OS 102 may start paging by transmitting an ID packet having an access code of a second peripheral device to the second peripheral device 200b (S1705). In this example, the second peripheral device 200b may be in a page scan state (S1710). The second peripheral device 200b, which has received the ID packet having the access code of the second peripheral device, may transmit the ID packet having the access code of the second peripheral device to the guest OS 102 (S1715). The guest OS 102 may transmit an FHS packet to the second peripheral device 200b (S1720). The second peripheral device 200b which has received the FHS packet may transmit the ID packet having the access code of the second peripheral device to the guest OS 102 (S1725). Accordingly, the second communication link may be set between the guest OS 102 and the second peripheral device 200b, and the guest OS 102 and the second peripheral device 200b may store the link key.

According to another example embodiment, the guest OS 102 of the electronic device 100 may set a second communication link with a peripheral device which has set a communication link with the host OS 101. In this example, the guest OS 102 may share a link key, which is previously stored between the host OS 101 and the peripheral device, with the host OS 101. Therefore, the paging procedure descried with reference to FIG. 17 may be omitted. The guest OS 102 may be provided with the access code of the second peripheral device, the link key, and the like stored in the host OS 101 and may set the second communication link.

According to an example embodiment, when the host OS 101 or the guest OS 102 sets up a communication link with the peripheral device 200, the host OS 101 may provide a GUI for allowing a user to determine whether to share the peripheral device 200 with the guest OS 102.

Figure 18A:
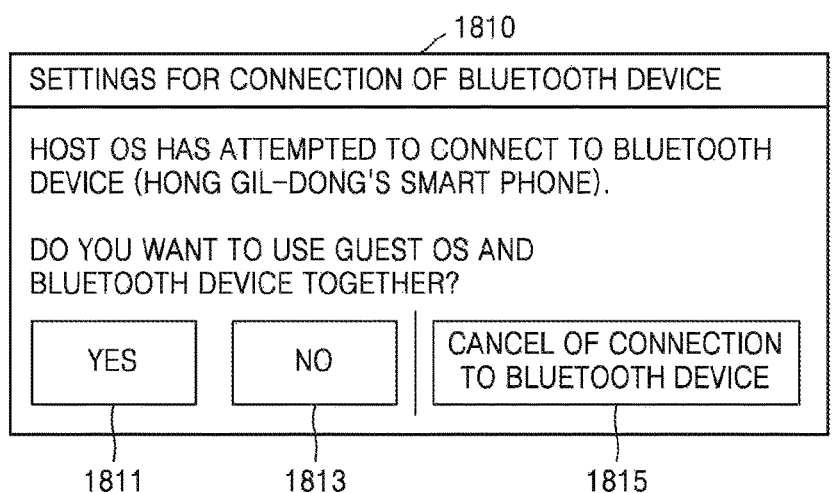
FIGS. 18A to 18C are diagrams illustrating an example of a GUI for allowing a user to set whether a host OS will share a peripheral device with a guest OS.
Figure 18B:
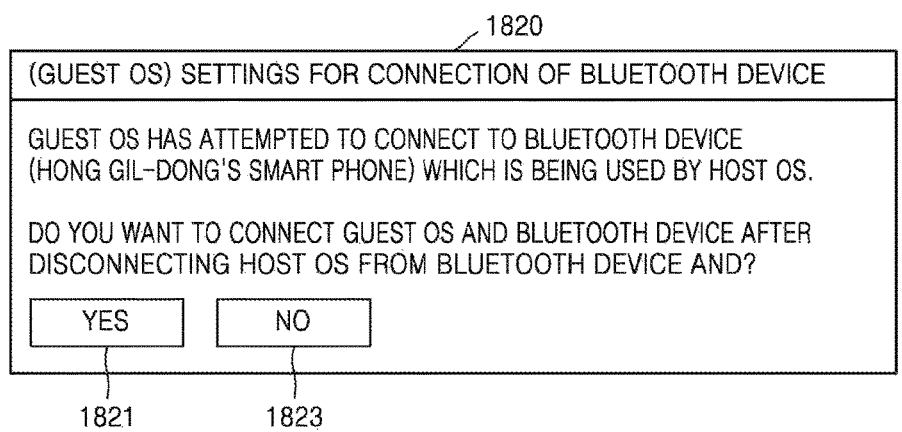
Figure 18C:
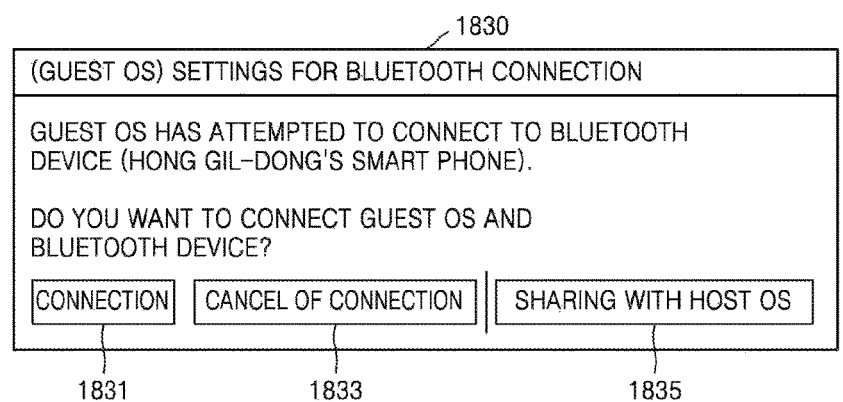

FIGS. 18A to 18C are diagrams illustrating an example of a GUI for allowing a user to set whether the host OS 101 will share the peripheral device 200 with the guest OS 102.

Referring to FIG. 18A, when the host OS 101 sets up a communication link with a new peripheral device, the host OS 101 may provide a first setting window 1810 for allowing a user to set whether the OS 101 will share the new peripheral device with the guest OS 102.

According to an example embodiment, the first setting window 1810 may include a "Yes" button image 1811 for setting that the host OS 101 shares the new peripheral device with the guest OS 102, a "No" button image 1813 for setting that the host OS 101 exclusively uses the new peripheral device, and a "Cancel of connection to Bluetooth device" button image 1815 for releasing a communication link.

Referring to FIG. 18B, when the host OS 101 attempts to set the second communication link with a peripheral device which has already set a communication link with the host OS 101, the guest OS 102 may provide a second setting window 1820 for allowing a user to determine whether the host OS will share the peripheral device with the guest OS 102. In this example, the peripheral device may be set to be exclusively used by the host OS 101.

According to an example embodiment, the second setting window 1820 may include a "Yes" button image 1821 for setting that the host OS 101 shares the peripheral device with the guest OS 102, and a "No" button image for maintaining settings in which the host OS 101 exclusively uses the peripheral device.

Referring to FIG. 18C, when the host OS 101 attempts to set a communication link with a new peripheral device, the guest OS 102 may provide a third setting window 1830 for allowing a user to determine whether the host OS will share the new peripheral device with the guest OS 102.

According to an example embodiment, the third setting window 1830 may include a "Connection" button image 1831 for allowing a user to set that the guest OS 102 sets up a communication link with the peripheral device, a "connection cancel" button image 1833 for allowing a user to cancel communication link set-up, and a "sharing with Host OS" button image 1835 for allowing a user to set that the host OS 101 shares the peripheral device with the guest OS 102.

Figure 19:
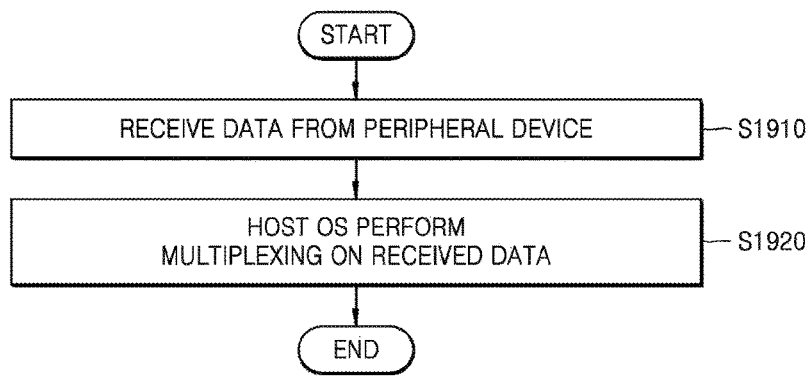
FIG. 19 is a flowchart illustrating an example method of receiving data from a peripheral device in an electronic device.

FIG. 19 is a flowchart illustrating an example method of receiving data from the peripheral device 200 in the electronic device 100.

Referring to FIG. 19, in operation S1910, the host OS 101 may receive data from the peripheral device 200.

For example, the host OS 101 may receive command packet data, event packet data, ACL packet data, and SCO packet data. The ACL packet may support one-to-one connection and may be transmitted according to the symmetric or asymmetric circuit switching scheme. The SCO packet may be transmitted according to the symmetric circuit switching scheme mainly used for voice.

In operation S1920, the host OS 101 may perform multiplexing on received data. The multiplexing may be to determine a target OS (e.g., the host OS 101 or the guest OS 102) to which the received data is to be provided.

According to an example embodiment, the host OS 101 and the guest OS 102 may transmit data through a first communication link set between the host OS 101 and the peripheral device 200 together, or a first link key stored at the time of setting the first communication link may be shared with the guest OS 102. Therefore, the peripheral device 200 may transmit data of which the target OS is not identified.

According to some example embodiments, the host OS 101 may manage a connection tracking table. For example, the host OS 101 may store a handler value included in the ACL packet or the SCO packet received from the peripheral device 200 in the connection tracking table and switch/maintain a target OS by comparing the handler value with a previous handler value.

When the target OS is determined, the host OS 101 may maintain the target OS until reception of entire data is completed. For example, when a command packet is received, the host OS 101 may maintain the target OS until a completion event packet is received.

The host OS 101 may determine whether to provide data received from the peripheral device by an HCI layer (588 in FIG. 5) to a higher layer of the host OS 101 or the guest OS 102.

Figure 20:
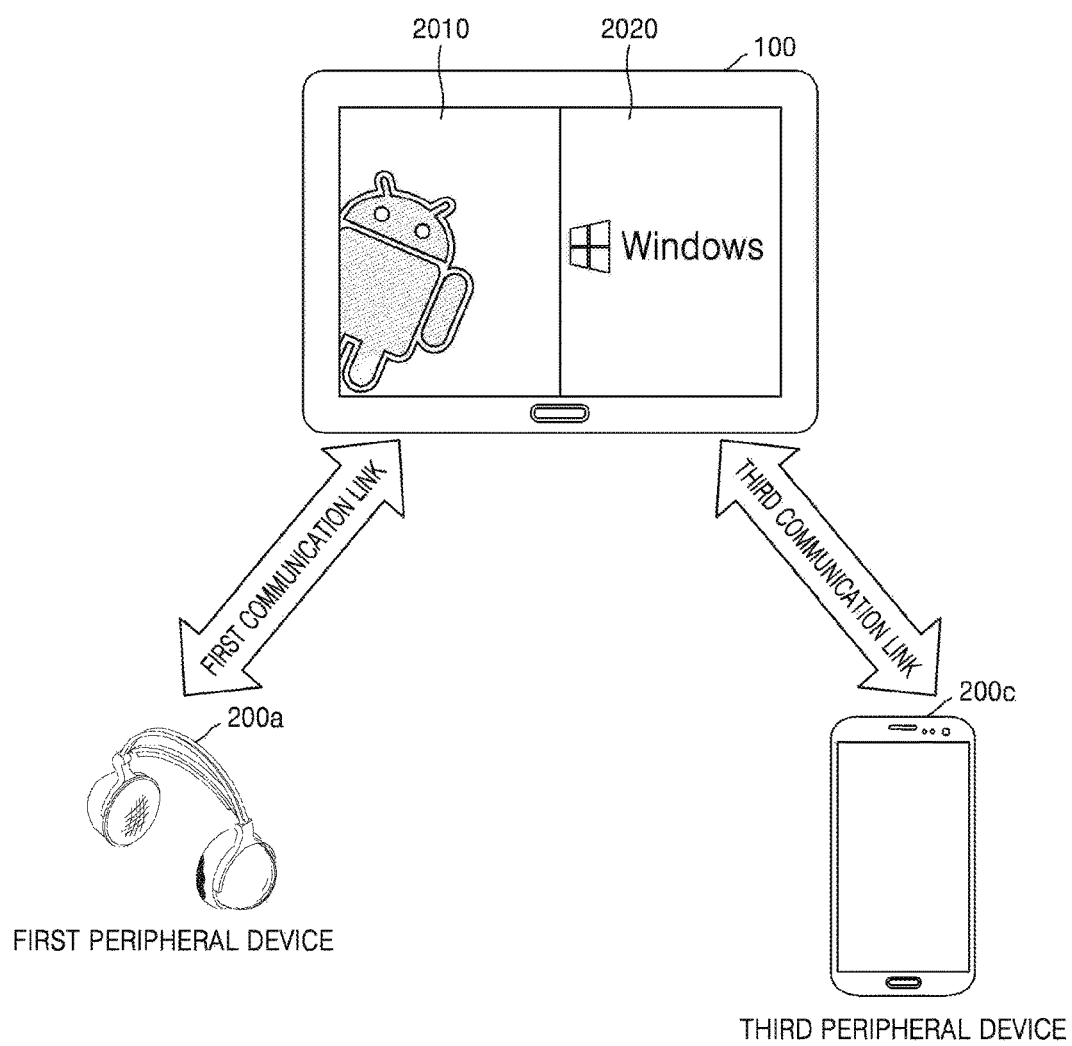
FIG. 20 is a diagram illustrating an example method of communicating with peripheral devices in an electronic device according to an exemplary embodiment.

FIG. 20 is a diagram illustrating an example method of communicating with peripheral devices in the electronic device 100.

Referring to FIG. 20, the electronic device 100 may display an operation screen 2010 of the host OS 101 and an operation screen 2020 of the guest OS 102 together on a screen of the electronic device 100. The OSs may set a communication link with different peripheral devices.

For example, the host OS 101 may set a first communication link with a first peripheral device 200*a*. The host OS 101 may transmit and receive audio data to and from the first peripheral device 200*a* based on a first link key stored at the time of setting the first communication link.

The host OS 101 may set a third communication link with a third peripheral device 200*c*. The host OS 101 may transmit and receive text data to and from the third peripheral device 200*c* based on a third link key stored at the time of setting the third communication link.

In this example, data received from the first peripheral device 200*a* and the third peripheral device 200*c* may be based on different link keys and therefore, the host OS 101 may not perform multiplexing on received data.

Figure 21:
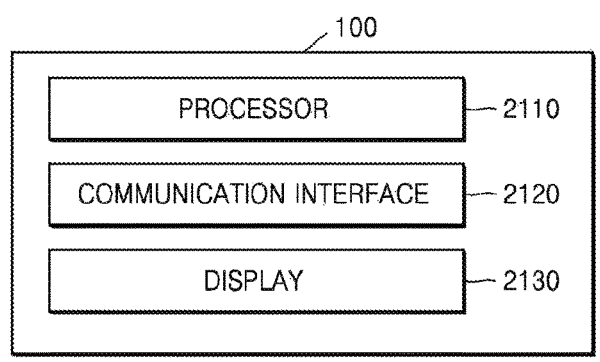

FIGS. 21 and 22 are block diagrams illustrating example configurations of the electronic device 100.

Referring to FIG. 21, according to some example embodiments, the electronic device 100 may include a processor (e.g., including processing circuitry) 2110, a communication interface (e.g., including communication circuitry) 2120, and a display 2130. However, the illustrated elements are not essential elements. The electronic device 100 may be realized by a larger or smaller number of elements than the number of the illustrated elements.

According to some example embodiments, as illustrated in FIG. 22, for example, the electronic device 100 may further include a user interface 2240, a sensing unit (e.g., including sensing and/or sensor circuitry) 2250, an A/V input unit (e.g., including input circuitry) 2260, and a memory 2270, in addition to the processor 2110, the communication interface 2120, and the display 2130.

The processor 2110 may generally be configured to control an overall operation of the electronic device 100. For example, the processor 2110 may generally control the communication interface 2120, the display 2130, the user interface 2240, the A/V input unit 2260, and the memory 2270.

According to an example embodiment, the processor 2110 may be configured to drive a host OS and a guest OS. The processor 2110 may be configured to receive data from the guest OS 102, and to control the host OS 101 which determines whether to switch from a first communication link set between the host OS 101 and a peripheral device 200 to a second communication link set between the guest OS 102 and the peripheral device 200. The processor 2110 may be configured to control the host OS 101 which packetizes data based on the determination.

According to an example embodiment, the processor 2110 may be configured to determine to switch from the first communication link to the second communication link when data provided to the host OS 101 by the guest OS 102 includes an HCI packet, and may be configured to determine to maintain the first communication link when the data does not include an HCI packet. According to another example embodiment, when it is set that the host OS 101 exclusively uses the peripheral device 200, the processor 2110 may be configured to determine to switch from the first communication link to the second communication link. When it is set that the host OS 101 shares the peripheral device 200 with the guest OS 102, the processor 2110 may be configured to determine to maintain the first communication link.

According to an example embodiment, in the case of maintaining the first communication link, the processor 2110 may be configured to perform control such that the host OS performs authentication with the peripheral device 200 based on a first link key which is stored at the time of setting the first communication link. The processor 2110 may be configured to perform control such that the host OS 101 performs first packetization and second packetization on data provided by the guest OS 102. In this example, the first packetization may include authentication on a logical channel of the first communication link, addition of identification information of a counterpart device, error control, or the like. The second packetization may include addition of information based on characteristics of a physical transmission path on a physical channel of the first communication link, packet segmentation, packet transmission and reception, or the like. Data on which the first packetization has been performed may have an HCI packet format, and data on which the second packetization has been performed may have a Bluetooth packet format, an USB packet format, a UART packet format, or the like. The second packetization may be performed by the communication interface 2120 under the control of the processor 2110.

When it is determined to switch from the first communication link to the second communication link, the processor 2110 may be configured to perform control such that the guest OS 102 performs authentication with the peripheral device 200 based on the second communication link. In this example, the second communication link may share a link key, which is stored at the time of setting the first communication link, with the first communication link. The data provided by the guest OS 102 may be data on which the guest OS 102 has performed the first packetization under the control of the processor 2110. Therefore, the data provided by the guest OS 102 may include an HCI packet. The processor 2110 may be configured to perform control such that the host OS 101 performs the second packetization on data provided by the guest OS 102.

According to another example embodiment, the processor 2110 may be configured to allow the display 2130 to switch from an operation screen of the host OS 101 to an operation screen of the guest OS 102. The processor 2110 may be configured to perform control such that the host OS 101 determines whether to switch from the first communication link to the second communication link. The processor 2110 may be configured to perform control such that the host OS 101 packetizes data received from the guest OS 102 based on the determination.

According to another example embodiment, the processor 2110 may be configured to control the host OS 101 which receives a request to search for peripheral devices from the guest OS 102. The processor 2110 may be configured to perform control such that the host OS 101 searches for peripheral devices. For example, the processor 2110 may be configured to perform control to transmit an inquiry message to unspecified peripheral devices through the communication interface 2120.

The processor 2110 may be configured to perform control such that the host OS 101 may extract a peripheral device which is capable of setting a communication link with the guest OS 102, from among found peripheral devices. For example, the processor 2110 may be configured to perform control such that the host OS 101 may extract a peripheral device which has not set a communication link with the host OS 101, from among found peripheral devices. The processor 2110 may be configured to perform control such that the host OS 101 may extract a peripheral device which is set to be exclusively used by the host OS 101, from among found peripheral devices.

The processor 2110 may be configured to perform multiplexing on data received from a peripheral device. In this example, the multiplexing may be to determine a target OS (that is, the host OS 101 or the guest OS 102) to which the received data is to be provided. For example, the processor 2110 may be configured to determine a target OS based on a connection tracking table.

The communication interface 2120 may include one or more elements (e.g., communication circuitry) which allow the electronic device 100 to communicate with the peripheral device 200. For example, the communication interface 2120 may include a short-range wireless communication interface 2121, a mobile communication interface 2122, and a broadcast reception unit 2123.

Examples of the short-range wireless communication interface 2121 may include, for example, a Bluetooth chip, a Bluetooth low energy (BLE) chip, a near field communication (NFC/RFID) chip, a wireless local area network (WLAN) chip, WiFi chip (not shown), a Zigbee communication chip, an infrared data association chip IrDA (not shown), a Wi-Fi direct (WFD) chip, an Ant+ chip, a UWB chip, or the like, but are not limited thereto.

The mobile communication interface 2122 may transmit and receive a radio signal to and from at least one of a base station, an external terminal, and a server over a mobile communication network. The radio signal may include, for example, a voice call signal, a video call signal, or various types of data according to the transmission and reception of short message service (SMS) messages/multimedia messages.

The broadcast reception unit 2123 may receive a broadcast signal and/or broadcast-related information from the outside through a broadcast channel. The broadcast channel may include a satellite channel and a terrestrial channel. According to modifications, the electronic device 100 may not include at least one of the mobile communication interface 2122 and the broadcast reception unit 2133.

According to some example embodiments, a Bluetooth chip may include a Bluetooth controller (not illustrated). The Bluetooth controller may be controlled by the processor 2110. The processor 2110 may be configured to perform control such that the host OS 101 performs the second packetization in the Bluetooth controller.

According to an example embodiment, the communication interface 2120 may transmit packetized data to the peripheral device 200 under the control of the processor 2110. The communication interface 2120 may receive data having a packet format from the peripheral device 200.

The display 2130 may display information processed in the electronic device 100 under the control of the processor 2110. The display 2130 may display a GUI for receiving control information from a user of the electronic device 100.

According to an example embodiment, the display 2130 may display information processed by at least one of the host OS 101 and the guest OS 102 under the control of the processor 2110. For example, the display 2130 may display an execution screen of an application executed on at least one of the host OS 101 and the guest OS 102. The display 2130 may switch from the operation screen of the host OS 101 to the operation screen of the guest OS 102 and display the operation screen of the guest OS 102.

Examples of the display 2130 may include a liquid crystal display (LCD) type display, an organic light emitting diodes (OLED) type display, a plasma display panel type display, and a vacuum fluorescent display (VFD) type display, or the like. It is readily understood by those of ordinary skill in the art that displayable information may vary depending on a display type.

The user interface 2240 may refer, for example, to a unit (e.g., hardware circuitry, firmware, software or any combination thereof) that allows the user to input data for controlling the electronic device 100. Examples of the user interface 2240 may include a key pad, a dome switch, a touch pad, which may be a capacitive overlay type, a resistive overlay type, an infrared beam type, a surface acoustic wave type, an integral strain gauge type, or a piezoelectric type, a jog wheel, or a jog switch, but are not limited thereto.

According to an example embodiment, the user interface 2240 may receive a user input for switching from the operation screen of the host OS 101 to the operation screen of the guest OS 102. The user interface 2240 may receive a user input for various GUIs provided through the display 2130.

The sensing unit 2250 may include, for example, at least one of a geomagnetic sensor 2251, an acceleration sensor 2252, a temperature/humidity sensor 2253, an infrared sensor 2254, a gyroscope sensor 2255, a position sensor 2256, a pressure sensor 2257, a proximity sensor 2258, and an RGB sensor (illuminance sensor) 2259, but is not limited thereto. Since the function of each sensor may be intuitively inferred by those of ordinary skill in the art from the name thereof, a detailed description thereof is omitted herein.

The A/V input unit 2260 may be circuitry configured for input of an audio signal or a video signal, and may include a camera 2261, a microphone 2262, or the like. The camera 2261 may obtain a picture frame, such as a still picture or a moving picture, through an image sensor in a video call mode or a photography mode. The image captured through the image sensor may, for example, be processed through the processor 2110 and a separate image processing unit (not illustrated).

The picture frame processed in the camera 2261 may be stored in the memory 2270 or be transmitted to the outside through the communication interface 2120. Two or more cameras 2261 may be provided according to configurations of the electronic device.

The microphone 2262 may receive an external sound signal and process the external sound signal into electric voice data. For example, the microphone 2262 may receive a sound signal from an external device or a speaker. The microphone 2262 may use various noise removal algorithms for removing noise occurring at the time of receiving the external sound signal.

The memory 2270 may store programs for processing and control of the processor 2110, and input/output data (for example, a plurality of menus, a plurality of first layer sub-menus corresponding to each of the plurality of menus, a plurality of second layer sub-menus corresponding to each of the plurality of first layer sub-menus, and the like).

According to an example embodiment, the memory 2270 may store programs for the host OS 101 and the guest OS 102.

According to an example embodiment, the memory may store a setting value to determine whether the host OS 101 will share the peripheral device 200 with the guest OS 102, in a table format.

The memory 2270 may store a connection tracking table to determine a target OS to which data received from the peripheral device 200 is to be provided (that is, the host OS 101 or the guest OS 102).

The memory 2270 may include, for example, at least one type of storage medium from among a flash memory type, a hard disk type, a multimedia card micro type, a card type memory (for example, SD, XD memory), a random access memory, a static random access memory (SDRAM), a read-only memory (RAM), electrically erasable programmable read-only memory (EEPROM), a programmable read-only memory (PROM), a magnetic memory, a magnetic disk, and an optical disk. Also, the electronic device 100 may manage a web storage or a cloud server, which performs a storage function of the memory 2270 on the Internet.

The example embodiments set forth herein may be embodied as program instructions that can be executed by various computing units and recorded on a non-transitory computer-readable recording medium. Examples of the non-transitory computer-readable recording medium may include program instructions, data files, and data structures solely or in combination. The program instructions recorded on the non-transitory computer-readable recording medium may be specifically designed and configured for the disclosure, or may be well known to and usable by those of ordinary skill in the field of computer software. Examples of the non-transitory computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device specially configured to store and execute program instructions (e.g., a ROM, a random access memory (RAM), a flash memory, etc.). Examples of the program instructions may include not only machine language codes prepared by a compiler but also high-level codes executable by a computer by using an interpreter.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of communication between an electronic device and a peripheral device in a host operating system (OS) and a guest OS installed on the electronic device, the method comprising:

receiving, by the host OS, first data from the guest OS;

determining, by the host OS based on the first data, whether to switch from a first communication link to a second communication link to transmit and receive data between the electronic device and the peripheral device;

packetizing, by the host OS, the first data based on the determination; and transmitting the packetized data to the peripheral device.

2. The method of claim 1, wherein the first communication link is a communication link between the host OS and the peripheral device, and the second communication link is a communication link between the guest OS and the peripheral device, and the second communication link shares a link key with first communication link, the link key being stored in the host OS and the peripheral device at a time of setting the first communication link.

3. The method of claim 2, wherein the determining of whether to switch from the first communication link to the second communication link includes determining to switch from the first communication link to the second communication link when the first data includes a host controller interface (HCI) packet, and determining to maintain the first communication link when the first data does not include an HCI packet.

4. The method of claim 2, wherein the determining of whether to switch from the first communication link to the second communication link includes:

determining to switch from the first communication link to the second communication link when the host OS exclusively uses the peripheral device, and determining to maintain the first communication link when the host OS shares the peripheral device with the guest OS.

5. The method of claim 3, wherein the HCI packet included in the first data is generated by the guest OS based on the second communication link.

6. The method of claim 5, wherein the packetizing of the first data by the host OS when it is determined to switch to the second communication link includes generating a Bluetooth packet corresponding to the HCI packet included in the first data.

7. The method of claim 3, wherein the packetizing of the first data by the host OS when it is determined to maintain the first communication link includes:

performing, by the host OS, authentication with the peripheral device based on the link key stored in the host OS and the peripheral device at the time of setting the first communication link;

generating, by the host OS, an HCI packet for the first data based on the first communication link; and generating a Bluetooth packet corresponding to the HCI packet based on physical characteristics of the first communication link.

8. The method of claim 3, when it is determined to maintain the first communication link, further comprising:

acquiring, by the host OS, second data processed in the host OS;

combining, by the host OS, the first data with the second data;

packetizing, by the host OS, the combined data; and transmitting the packetized combined data to the peripheral device based on the first communication link.

9. A method of communication between an electronic device and a peripheral device in a host OS and a guest OS installed on the electronic device, comprising:

switching from an operation screen of the host OS displayed on a screen of the electronic device to an operation screen of the guest OS;

determining whether to switch from a first communication link to a second communication link based on data received from the guest OS, and transmitting and receiving data between the electronic device and the peripheral device based on a determination result;

packetizing, by the host OS, third data received from the guest OS based on the determination result; and transmitting the packetized data to the peripheral device.

10. A method of communication between an electronic device and a peripheral device in a host OS and a guest OS installed on the electronic device, comprising:

receiving, by the host OS, a request to search for peripheral devices from the guest OS;

searching, by the host OS, for at least one peripheral device based on an inquiry message;

extracting, by the host OS, a peripheral device capable of setting a communication link with the guest OS from at least one peripheral device among at least one found peripheral device; and transmitting, by the host OS, information on the extracted peripheral device to the guest OS.

11. The method of claim 10, wherein the extracting of the peripheral device capable of setting the communication link with the guest OS includes:

extracting a peripheral device that is not set to be exclusively used by the host OS and which has not set a communication link with the host OS from among the at least one found peripheral device; and extracting a peripheral device that is set to be exclusively used by the host OS and which has set a communication link with the host OS, from among the at least one found peripheral device.

12. An electronic device comprising:

processing circuitry configured to control a guest OS and a host OS which receives first data from the guest OS, to determine whether to switch from a first communication link to a second communication link based on the first data, and to packetize the first data based on a determination result, the first communication link being set to transmit and receive data between the electronic device and the peripheral device; and communication circuitry configured to transmit data packetized by the host OS to the peripheral device.

13. The electronic device of claim 12, wherein the first communication link comprises a communication link set between the host OS and the peripheral device, and the second communication link comprises a communication link set between the guest OS and the peripheral device, and the second communication link shares a link key with first communication link, the link key being stored in the host OS and the peripheral device at time of setting the first communication link.

14. The electronic device of claim 13, wherein the processing circuitry is configured to switch from the first communication link to the second communication link when the first data includes a host controller interface (HCI) packet, and to maintain the first communication link when the first data does not include an HCI packet.

15. The electronic device of claim 12, wherein the processing circuitry is configured to switch from the first communication link to the second communication link when the host OS exclusively uses the peripheral device, and the processing circuitry is configured to maintain the first communication link when the host OS shares the peripheral device with the guest OS.

16. The electronic device of claim 14, wherein the HCI packet included in the first data is generated by the guest OS based on the second communication link.

17. The electronic device of claim 14, wherein when it is determined to maintain the first communication link, the processing circuitry is configured to control the host OS which performs authentication with the peripheral device based on the link key stored in the host OS and the peripheral device at the time of setting the first communication link, to generate an HCI packet for the first data based on the first communication link, and to generate a Bluetooth packet corresponding to the HCI packet based on physical characteristics of the first communication link.

18. The electronic device of claim 14, wherein when it is determined to maintain the first communication link, the processing circuitry is configured to control the host OS to acquire second data processed in the host OS and to combine the first data with the second data, and the communication circuitry is configured to transmit data resulting from combining the first data with the second data to the peripheral device based on the first communication link.

19. An electronic device comprising:
a display configured to switch from an operation screen of the host OS displayed on a screen of the electronic device to an operation screen of the guest OS;
processing circuitry configured to control a guest OS and a host OS to determine whether to switch from a first communication link to a second communication link based on data received from the guest OS, and to packetize third data received from the guest OS based on a determination result, the first communication link being set to transmit and receive data between the electronic device and the peripheral device; and
communication circuitry configured to transmit data packetized by the host OS to the peripheral device.

20. A computer-readable recording medium storing one or more programs including instructions which, when executed, perform the method of claim 1.

* * * * *